US011683717B2

United States Patent
Balasubramanian et al.

(10) Patent No.: US 11,683,717 B2
(45) Date of Patent: Jun. 20, 2023

(54) METHOD AND APPARATUS FOR DETERMINING WIRELESS MNO COVERAGE AND EFFICIENTLY OPERATING AN ENTERPRISE WIRELESS COMMUNICATION NETWORK

(71) Applicant: Celona, Inc., Cupertino, CA (US)

(72) Inventors: Srinivasan Balasubramanian, San Diego, CA (US); Mehmet Yavuz, Palo Alto, CA (US); Preethi Natarajan, Saratoga, CA (US)

(73) Assignee: Celona, Inc., Campbell, CA (US)

( * ) Notice: Subject to any disclaimer, the term of this patent is extended or adjusted under 35 U.S.C. 154(b) by 66 days.

(21) Appl. No.: 17/214,655

(22) Filed: Mar. 26, 2021

(65) Prior Publication Data
US 2022/0150752 A1 May 12, 2022

Related U.S. Application Data

(63) Continuation-in-part of application No. 17/126,839, filed on Dec. 18, 2020, now Pat. No. 11,540,176.
(Continued)

(51) Int. Cl.
*H04B 5/00* (2006.01)
*H04W 28/02* (2009.01)
*H04W 24/08* (2009.01)

(52) U.S. Cl.
CPC ....... *H04W 28/0289* (2013.01); *H04W 24/08* (2013.01)

(58) Field of Classification Search
CPC ..... G06N 20/00; H04L 12/4633; H04L 12/66; H04L 43/0882; H04L 67/22; H04W 4/08;
(Continued)

(56) References Cited

U.S. PATENT DOCUMENTS 9,647,918 B2  5/2017 Raleigh
2003/0236094 A1  12/2003 Jami
(Continued)

FOREIGN PATENT DOCUMENTS

BR    PI 0312065-1 B1   8/2017
WO    2022098558        5/2022
(Continued)

OTHER PUBLICATIONS

Kibria et al., Shared Spectrum Access Communications: A Neutral Host Micro Operator Approach, arXiv, 28 pages, Aug. 15, 2017.*
(Continued)

*Primary Examiner* — Frank Duong
(74) *Attorney, Agent, or Firm* — Jaquez Land Greenhaus & McFarland LLP; Bruce W. Greenhaus, Esq.

(57) ABSTRACT

A transfer management system for efficiently operating an enterprise wireless communication network (EN) at a campus location enables the EN to control congestion, selectively and smoothly admit UEs, and manage UE exits from the EN. An MNO Network (MN) footprint learning system learns the different MN footprints on the campus, relative to the BS/APs deployed by the individual enterprise, which defines a footprint of wireless coverage for each MNO that has wireless coverage. The MN footprint provides useful information that enables successfully transitioning a UE between an EN and an MNO, which provides the EN with the ability to utilize other networks to offload one or more UEs to manage congestion, delay or deny admission of UEs, and proactively exit UEs to manage congestion or for other reasons.

19 Claims, 18 Drawing Sheets

Related U.S. Application Data

(60) Provisional application No. 63/111,516, filed on Nov. 9, 2020.

(58) Field of Classification Search
CPC ..... H04W 24/04; H04W 24/08; H04W 28/02; H04W 28/0268; H04W 28/0289; H04W 28/0942; H04W 36/0011; H04W 36/08; H04W 36/14; H04W 36/18; H04W 36/24; H04W 36/30; H04W 44/045; H04W 72/04; H04W 80/04; H04W 84/105; H04W 84/16
See application file for complete search history.

(56) References Cited

U.S. PATENT DOCUMENTS

| | | | |
|---|---|---|---|
| 2004/0203791 A1* | 10/2004 | Pan | H04W 88/06 455/442 |
| 2010/0195447 A1 | 8/2010 | George | |
| 2012/0014332 A1 | 1/2012 | Smith et al. | |
| 2012/0122405 A1 | 5/2012 | Gerber | |
| 2012/0289232 A1 | 11/2012 | Ostrup et al. | |
| 2014/0136709 A1 | 5/2014 | Chin et al. | |
| 2014/0321282 A1 | 10/2014 | Pragada et al. | |
| 2015/0312950 A1 | 10/2015 | Cartmell | |
| 2016/0100331 A1* | 4/2016 | Ahmavaara | H04W 28/0846 370/236 |
| 2016/0183156 A1 | 6/2016 | Chin et al. | |
| 2016/0234877 A1 | 8/2016 | Bangolae et al. | |
| 2016/0270141 A1* | 9/2016 | Sharma | H04W 76/16 |
| 2016/0330602 A1 | 11/2016 | Das et al. | |
| 2017/0164234 A1* | 6/2017 | Kalapatapu | H04W 76/16 |
| 2018/0007587 A1 | 1/2018 | Feldman et al. | |
| 2019/0045371 A1 | 2/2019 | Fang et al. | |
| 2019/0215729 A1 | 7/2019 | Oyman et al. | |
| 2020/0008007 A1* | 1/2020 | Belghoul | H04W 4/50 |
| 2020/0068411 A1 | 2/2020 | Vagelos | |
| 2020/0205062 A1 | 6/2020 | Azizi et al. | |
| 2021/0243651 A1 | 8/2021 | Syed | |
| 2021/0360739 A1 | 11/2021 | Cui | |
| 2022/0007199 A1 | 1/2022 | Mahalingam | |
| 2022/0070682 A1 | 3/2022 | Mahalingam | |
| 2022/0150760 A1 | 5/2022 | Balasubramanian et al. | |
| 2022/0151019 A1 | 5/2022 | Balasubramanian et al. | |

FOREIGN PATENT DOCUMENTS

| | | |
|---|---|---|
| WO | 2022098560 | 5/2022 |
| WO | 2022098561 | 5/2022 |

OTHER PUBLICATIONS

Mun, Ruckus Wireless White Paper: CBRS Opens New Managed Services Opportunity, Mobile Experts, 9 pages, Feb. 2017.*

Duong, Frank, Office Action received from the USPTO dated Jun. 24, 2022 for U.S. Appl. No. 17/126,839, 18 pgs.

Thomas, Shane, International Search Report and Written Opinion received from the USRO dated Jan. 26, 2022 for appln. No. PCT/US21/57110, 39 pgs.

Rodriguez, Kari, International Search Report and Written Opinon received from the USRO dated Jan. 31, 2022 for appln. No. PCT/US21/57107, 16 pgs.

Rodriguez, Kari, International Search Report and Written Opinon received from the USRO dated Feb. 1, 2022 for appln. No. PCT/US21/57114, 14 pgs.

Duong, Frank, Notice of Allowance received from the USPTO dated Sep. 13, 2022 for U.S. Appl. No. 17/318,930, 22 pgs.

* cited by examiner

METHOD AND APPARATUS FOR DETERMINING WIRELESS MNO COVERAGE AND EFFICIENTLY OPERATING AN ENTERPRISE WIRELESS COMMUNICATION NETWORK

CROSS-REFERENCE TO RELATED APPLICATIONS—CLAIM OF PRIORITY

The present application is a Continuation-in-Part and claims priority to commonly-assigned and co-pending U.S. application Ser. No. 17/126,839, filed Dec. 18, 2020, entitled "Method and Apparatus for Load Control of an Enterprise Network on a Campus Based Upon Observations of Busy Times and Service Type". Application Ser. No. 17/126,839, and the present application, claims priority to U.S. Provisional Application No. 63/111,516, filed Nov. 9, 2020, entitled "Method and Apparatus for Load Control of an Enterprise Network on a Campus Based Upon Observations of Busy Times and Service Type", which are not incorporated by reference in their entirety.

BACKGROUND

Technical Field

The disclosed method and apparatus relate to methods and apparatus for operating an enterprise wireless communication network at a campus location, and particularly for determining Mobile Network Operator (MNO) coverage at the campus location, allocating resources to devices operating wirelessly across the campus location in that enterprise network, and transferring device communications between the enterprise network and an MNO.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their locations (campuses), and implementing digital solutions generally, to improve efficiency and reduce costs. Enterprises benefit from optimizing their computing, storage and networking infrastructure, and improving performance of the business applications. For this purpose, wireless network systems that make effective use of the spectrum within a business enterprise for wireless communication, improve the efficiency of communication within the organization and between the organization and the external entities. This improved communication capability increases business efficiency and reduces cost.
Conventional Admission and System Usage Control Conventional admission control of individual users and service is performed using static resource reservations, which typically involves allocating the maximum resource needs associated with a given service. Based on the algorithm of choice and the headroom allocated for variabilities in the services, conventional admission control generally either overestimates or underestimates network capability in terms of the network capacity planning because conventional admission control has no awareness of the potential congestion the network could face. Because a conventional network's admission control and service configurations are based on fixed configurations, the network lacks the ability to optimize resource allocations across the network. In other words, the fixed configuration limits network's ability to more efficiently allocate resources; for example, although a given service can be supported with several configurations, one or more of which might be more efficient than other configurations, the fixed configuration provided by the admission control will be used by the network. Furthermore, the fixed configuration is not adaptable to the real-time population of the users, active services, and other variabilities encountered during network operation.
Enterprise Networks and MNOs An enterprise wireless communication network (EN) is one type of private network, which is operated for use within a limited area by a limited group of authorized users. One or more ENs can be created at a location such as a warehouse, factory, research center or other building, and are usually operated by an organization for its own use. Other types of private networks may be operated by a private network manager for use by more than one organization.

Within an enterprise network location, multiple other networks may be operating and have overlapping coverage. For example, one or more Macro Networks (MNs-operated by Mobile Network Operators (MNOs)) may have coverage at some location within the enterprise network, and often, multiple MNs have coverage at some place within the enterprise network. A mobile network operator (MNO) is a telecommunications service provider organization that provides wireless voice and data communication for its subscribed mobile users. Mobile network operators usually own the complete telecom infrastructure for hosting and managing mobile communications. Mobile network operators are also known as carrier service providers, mobile phone operator and mobile network carriers.

MNOs operate macrocells (or macrosites) which are communication cells in MNO network that provides radio coverage served by a high-power cell site. Generally, macrocells provide coverage larger than microcells. The antennas for macrocells are typically mounted on ground-based masts, rooftops and other existing structures, at a height that provides a clear view over the surrounding buildings and terrain. However, due to their distance from the enterprise network, signal qualities and coverage by these MNO networks can vary greatly throughout the enterprise network; in some locations there can be strong coverage; in others, only weak or no coverage can be found. Multiple UEs may be operating within the enterprise network, and a given UE can potentially be supported on multiple networks (e.g., an enterprise cell, a macro cell of a Mobile Network Operator (MNO), and a Wi-Fi access point).

It would be advantageous to determine availability and efficiently utilize the capabilities of each MNO enterprise network for the benefit of the UEs operating in the enterprise location, and also to provide a smooth transfer to the MNO upon exiting the enterprise network. Using the conventional static approach both restricts the availability of the enterprise network and degrades the user experience under specific conditions. A lack of awareness of these dynamic conditions in the network limits the efficiency and operability of the enterprise network.

Communication Network Configurations

FIG. 1 is an illustration of a basic configuration for a communication network 100, such as a "4G LTE" (fourth generation Long-Term Evolution) or "5G NW" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs, BS/APs

As used herein, the term "UE", or "devices", or "UE devices" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed or placed at a fixed position within a campus location. In the illustration of FIG. 1, the UEs 101 include a first mobile phone 101a, a second mobile phone 101b, a laptop computer 101c (which can be moved around), and a printer 101d (typically situated at a fixed location). In other examples, the UEs may include factory sensors installed at fixed locations from which they can remotely monitor equipment such as an assembly line or a robotic arm's movement.

The UEs 101 connect wirelessly over radio communication links 105 to a Radio Access Network (RAN) 107 that typically includes multiple base station/access points (BS/APs) 109 that include antennas, amplifiers and other electrical and control units for communicating with the UEs. Typically, the radio communication links 105 operate using a Radio Resource Control (RRC) protocol, which is managed by circuitry in the BS/APs. One of the advantages of such wireless networks is their ability to provide communications to and from multiple wireless devices and provide these wireless devices with access to a large number of other devices and services even though the devices may be mobile and moving from location to location.

The term 'BS/AP' is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs and circuitry that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111, which provides an interface between the RAN 107 and other networks. The Core Network can have multiple functions. In one important function, the Core Network 111 provides access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 includes RAN Control Units 113 that manage the wireless network and provide control of the air interface between the BS/AP 119 and the UEs 101. The Core Network 111 may also coordinate the BS/APs 109 to minimize interference within the network.

CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. CBRS provides enormous wireless networking power to organizations that have never had such option before and opens up and creates opportunities for a range of new applications.

However, in order to accommodate prior users in this spectrum and as a condition for opening it for general use, certain prior users (including the military) have been given a higher priority to access the spectrum. To ensure that these users are given higher priority, use of this radio band is subject to spectrum control by a Spectrum Access System (SAS). Any enterprise implementing a CBRS network must follow the directions given by the SAS, such as which channels it can use and how much power it can transmit. In some instances, previously authorized channels may be suspended (temporary suspension of grant) or fully terminated (permanent termination of grant) by the SAS, and the CBRS network is then given a fixed period of time (sixty seconds currently) to terminate transmissions on that channel, which unfortunately can disrupt enterprise network operations and require reconfiguration to compensate for the lost channel.

FIG. 2 is a diagram of an example of a CBRS wireless communication network 200. In FIG. 2, a plurality of BS/APs 202 are deployed within a location 203 on the enterprise's campus, providing service to a plurality of UEs 204. In a CBRS system, the BS/APs may be termed CBSDs.

In FIG. 2, each BS/AP 202 has a range that represents its respective wireless coverage. A first UE 202a is wirelessly connected to a first BS/AP 204a, which is providing service to it. A second UE 204b is wirelessly connected to a second BS/AP 202b, and is providing service to that second UE 204b. Other UEs 204 connect to their respective BS/APs, for example third UE 204c, fourth UE 204d, fifth UE 204e, sixth UE 204f, and seventh UE 204g are shown in the enterprise location 203. All the BS/APs are connected to an operator core network 222 by any appropriate communication means, such as wire, fiber optic, wireless radio and/or a PDN 220. The operator core network 222 includes components such as an OAM Server 207, a SON assist unit 208, a Domain Proxy 209, an Automatic Configuration Server (ACS) 210, a Location Database 211, and other databases 212, all of which are connected to each other within the operator core network 222 by any appropriate means. The operator core network 222 is connected to an SAS 232, which is connected to a Spectrum Database 233 that includes data regarding the spectrum that it is managing. Collectively, the SAS 232 and the Spectrum Database 233 are referred to as a Spectrum Management Entity (SME) 234.

In a typical network architecture, the enterprise BS/APs are not managed directly by a SAS but instead by the Domain Proxy 309. In this architecture, the Domain Proxy 309 registers all the enterprise BS/APs as a group with the SAS 312 and performs interference coordination. The set of available channels for use as indicated by the SAS are carefully assigned among the enterprise BS/APs such that there is negligible/nil interference, or as minimal interference as possible. To achieve this, the Domain Proxy may utilize any appropriate system such as self-organizing algorithms (in the SON unit 308).

Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

The CBRS rules require that a Spectrum Access System (SAS) allocate spectrum to the CBSDs to avoid interference within the CBRS band. The Spectrum Access System (SAS) is a service, typically cloud-based, that manages the spectrum used in wireless communications of devices transmitting in the CBRS band, in order to prevent harmful interference to higher priority users such as the military and priority licensees. A CBRS device (CBSD) needs authorization from the SAS before starting to transmit in the CBRS band. Even after authorization, the SAS may suspend or terminate authorization of one or more the channels previously authorized.

Regardless of complexities, the CBRS band provides an opportunity to create new wireless networks, and there is a desire for utilizing and making maximum use of spectrum in the CBRS band while following the rules pertaining the CBRS usage, including effectively responding to directions from the SAS.

Wireless Coverage

Generally, in any type of wireless network, there is a need for ubiquitous coverage and high throughput connectivity. Unfortunately, wireless networks often lack seamless mobile coverage, and poor user experience is common in many indoor venues. CBRS systems can help with this problem, but coverage problems still remain to some extent. A wide variation of indoor venue environments (and campuses in general) requires flexible installation and customization in order to provide full coverage; however customization of traditional indoor cellular systems is typically too costly and complex for enterprise deployment at smaller venues. There is large gap between the top end of the indoor cellular market directly served by the Service Providers (SPs) and hundreds of thousands of smaller, low-traffic ("mid-market") venues, which creates an opportunity for wireless networks that bridge the gap between very large projects with direct SP involvements and large numbers of smaller projects that are too small for SPs to consider, but too complex for enterprises to handle on their own. It would be advantageous to provide a low-cost solution that removes complex business models associated with the multi-operator support On a campus installation, EN coverage and MNO coverage regions are not co-extensive. Typically, the EN coverage includes indoor coverage (e.g., within the walls of buildings), and some outdoor coverage. MNO coverage may be good outdoors; however, the high-power MNO wireless signal strength can be attenuated and absorbed by buildings and other obstacles, and therefore MNO coverage can be spotty in places. Particularly inside buildings (e.g., in basements, or the middle section of large buildings), MNO coverage may have minimal or no coverage. In other words, on a campus installation, MNO Networks may have some coverage, but there will be gaps. Regardless, to the extent that MNO coverage is available, it can be useful, and it would be advantageous to determine availability and efficiently utilize the resources of each MNO and enterprise network for the benefit of the UEs operating in the enterprise location, and also to provide smooth transfers between the EN and the MNO.

SUMMARY

A transfer management system for efficiently operating an enterprise wireless communication network (EN) at a campus location is described herein that allows user UEs to make seamless transitions (transfers) between the EN and a Mobile Network Operator (MNO) Network. The transfer management system enables the EN to control congestion, selectively and smoothly admit UEs, and manage UE exits from the EN without unnecessary service disruptions.

An MNO Network (MN) footprint learning system is disclosed that learns the different MN footprints on the campus, relative to the BS/APs deployed by the individual enterprise. The footprint learning system defines a footprint of wireless coverage for each MNO that has at least some wireless coverage on the campus location. Advantageously, the MN footprint provides useful information that enables successfully transitioning a UE between an EN and an MNO, which provides the EN with the ability to utilize other networks to offload one or more UEs to manage congestion, the ability to delay admission of UEs that have adequate MNO coverage, deny admission to manage congestion, and the ability to proactively exit UEs to manage congestion or for other reasons.

The MN footprints are learned by the EN as a function of location relative to the BS/APs in the EN's Radio Access Network (RAN), termed "RAN location" herein, which is advantageous because the MNO coverage for a particular UE in the EN can be quickly determined from the BS/AP data scanned by the UE. Particularly, the signal strength (e.g., RSRP) of the BS/APs measured by the UE allows the EN to use the MN footprints to determine availability of wireless coverage of another network, based upon RAN location. The UE's RAN location can be used to detect an exit from the campus for a given user and proactivity move the user to the associated MNO, knowing the MN footprint. Also, UE mobility transfers and transfer points can be based on the UE's capabilities and device type, and some UEs can be selected for specific transfers methods while the other UEs can be treated in more conservative manner.

Various embodiments of transfer management system are disclosed. A method of learning and utilizing a wireless footprint includes monitoring a plurality of the mobile UEs wirelessly connected to the EN while the mobile UEs travel through the campus location. Signal quality data from each of the UEs connected to the RAN is collected and utilized to define a RAN location. Signal quality data is collected from each of the UEs from the MNO Network signals that the UE is measuring, and the RAN and MN signal quality data is collected from the UEs and processed to map the MNO Network wireless coverage as a function of RAN location and thereby define a footprint of each external network (MN) as a function of RAN location. The MNO footprint is then utilized to transfer a UE between the EN and the MNO Network. The transfer may be initiated for any of a number of purposes such as congestion control, UE admission, and UE exit.

A network apparatus is disclosed for managing transfers of mobile User Equipment Devices (UEs) between a wireless Enterprise Network (EN) and a Mobile Network Operator (MNO) Network. The network apparatus includes an MN Footprint Learning Unit that provides wireless footprints of MNOs that have wireless coverage on the campus location and a Transfer Management Module for transferring wireless UE communications between the EN and one of the MNOs responsive to the MN footprint. The Transfer Management Module may include an admission control unit for admitting a UE into the EN from an MNO Network responsive to the footprint of the MNO Network, an exit control unit for transferring communications of a UE connected to the EN to an MNO Network responsive to the MN footprint of the MNO Network, and a congestion control unit for transferring communications of a UE connected to the EN, from the EN to an MNO Network responsive to the MN footprint of the MNO Network.

In some embodiments the enterprise wireless network operates on the Citizen's Broadband Radio Service (CBRS band), the BS/APs comprise CBRS Devices (CBSDs) that are located at a campus location and form part of an enterprise network. A CBRS system is a spectrum-controlled system in which the CBSDs must be registered before operation in order to avoid interference with other users such as incumbent users that have higher priority to use the CBRS band. In alternative implementations, other network architectures and other technologies, such as mm wave, or spectrum purchased/licensed from others, could be utilized.

BRIEF DESCRIPTION OF THE DRAWING

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 14A is a flow chart that shows overall load control operations based upon predicted congestion, and FIG. 14B is a flow chart of operations to allocate resources.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) Enterprise Network

Enterprise wireless communication networks have been moving towards digital solutions and therefore are continually searching to optimize their computing, data storage and networking infrastructures to provide optimal performance of their applications and connectivity for their users. For this purpose, wireless network systems are being developed to make effective use of the wireless spectrum available on the enterprise's campus locations. More efficient use of spectrum improves communication capabilities, reduces costs, and increases organizational efficiencies.

An implementation of an enterprise wireless communication network (EN) at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

An enterprise wireless communication network (EN) is one type of private network. Private networks are operated for use within a limited area by a limited group of authorized users, whereas public networks generally cover a larger area and are open for use by anyone that subscribes to the service by the network operator. One or more ENs can be created at a location such as a warehouse, factory, research center or other building, and are usually operated by an organization for its own use. Other types of private networks may be operated by a private network manager for use by more than one organization.

Figure 1:
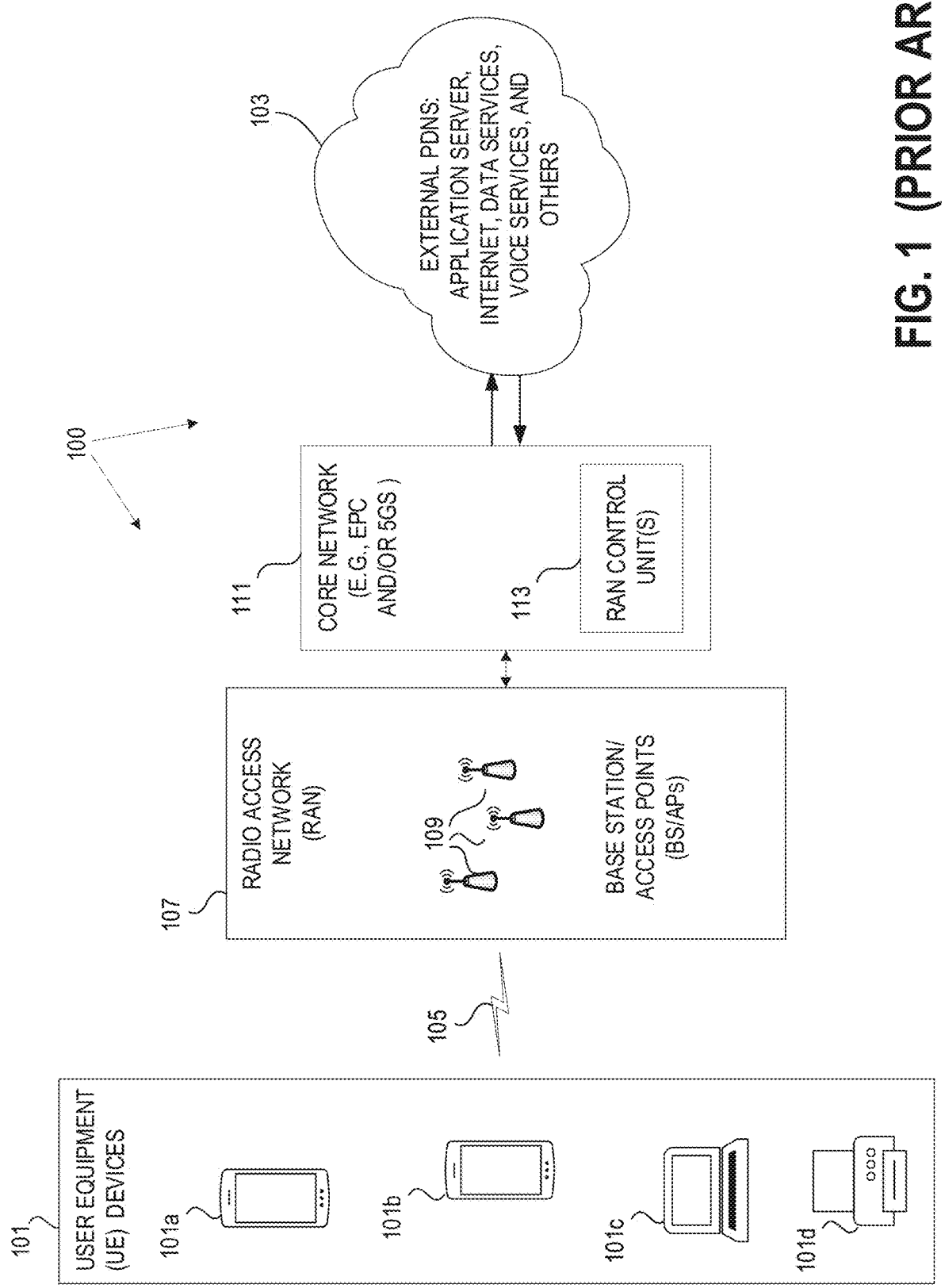
FIG. 1 is an illustration of a basic configuration for a communication network, such as a "4G LTE" (fourth generation Long-Term Evolution) or "5G NR" (fifth generation New Radio) network.
Figure 2:
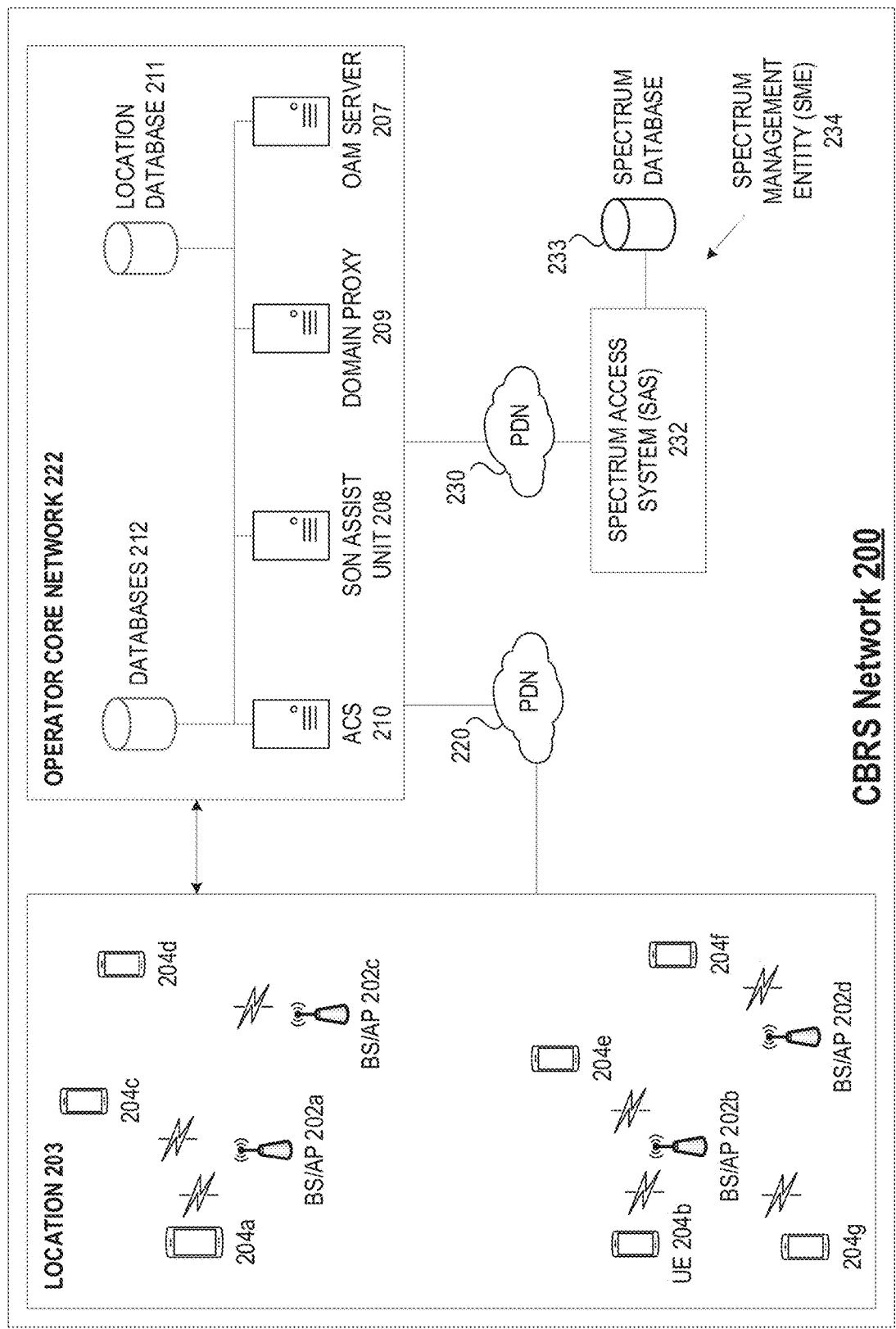
FIG. 2 is a block diagram of a wireless communication network in which a CBRS system is implemented, including BS/APs deployed at an enterprise location, UEs wirelessly connected to them, and an operator network connected to a Spectrum Management Entity (SME).
Figure 3:
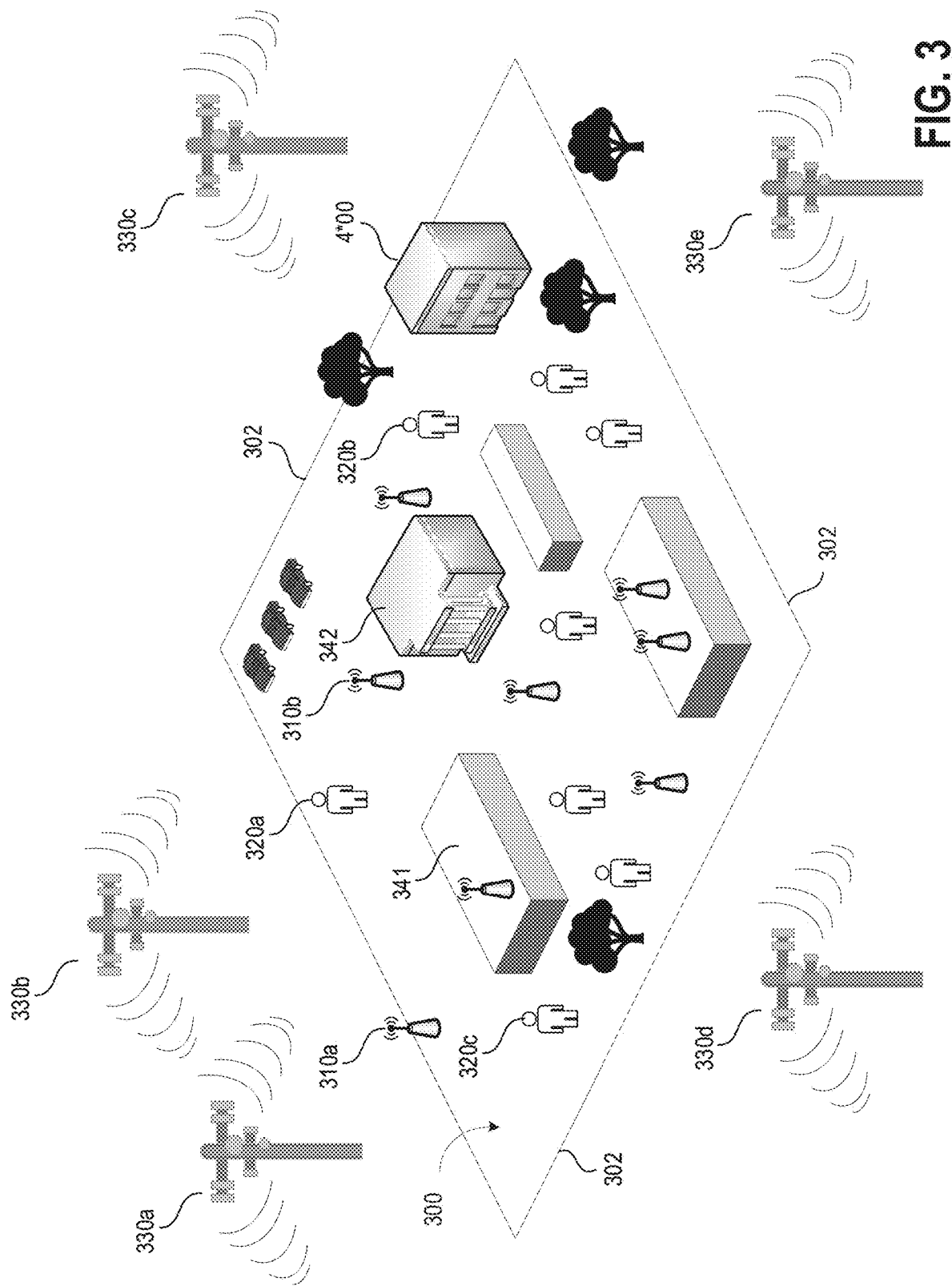
FIG. 3 is a perspective illustration of a campus location in which a plurality of BS/APs of an Enterprise Network (EN) are installed to provide wireless coverage to a plurality of mobile users.
Figure 4:
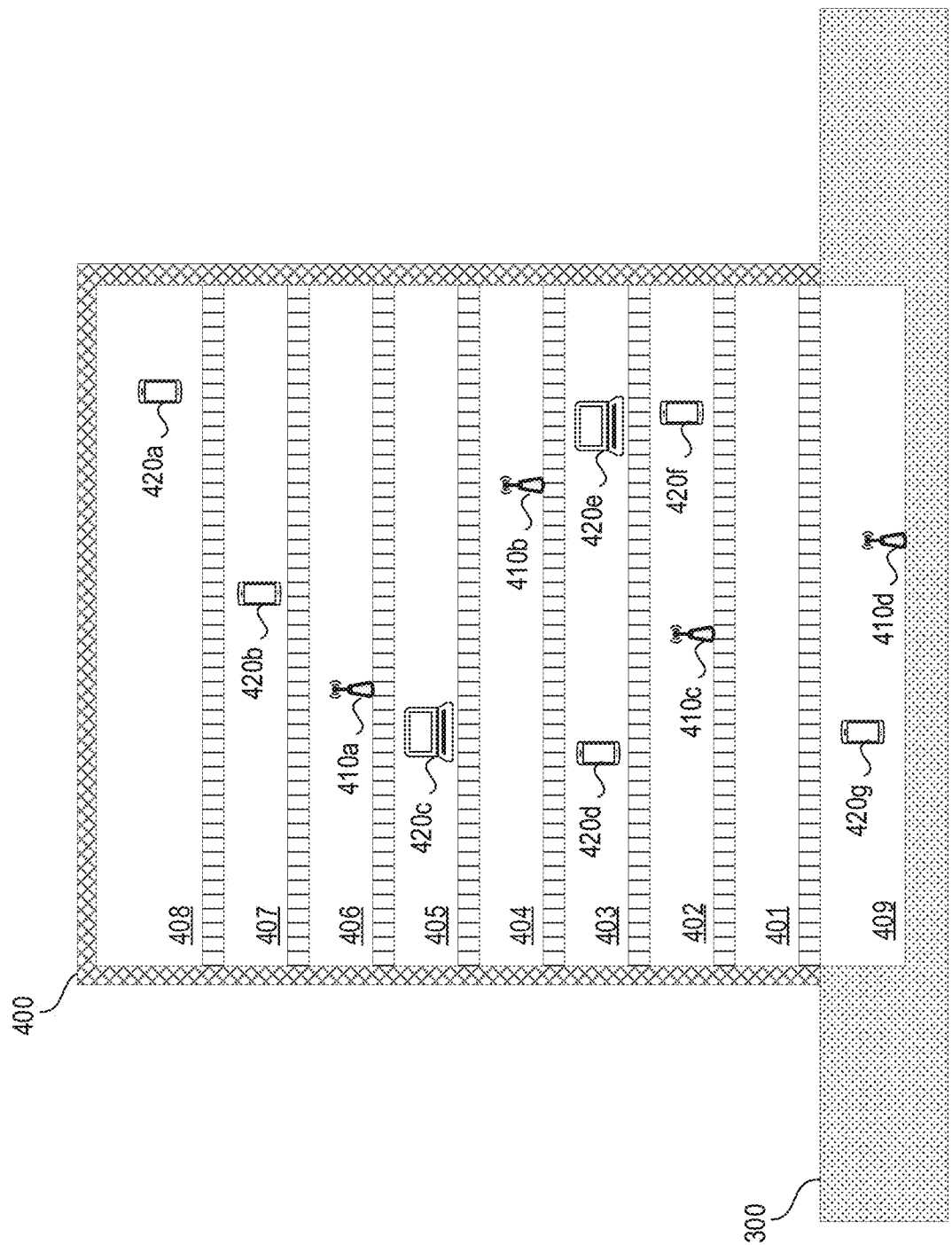
FIG. 4 is a cross-sectional view of a building on the campus location in which BS/APs are installed on different floors.
Figure 5:
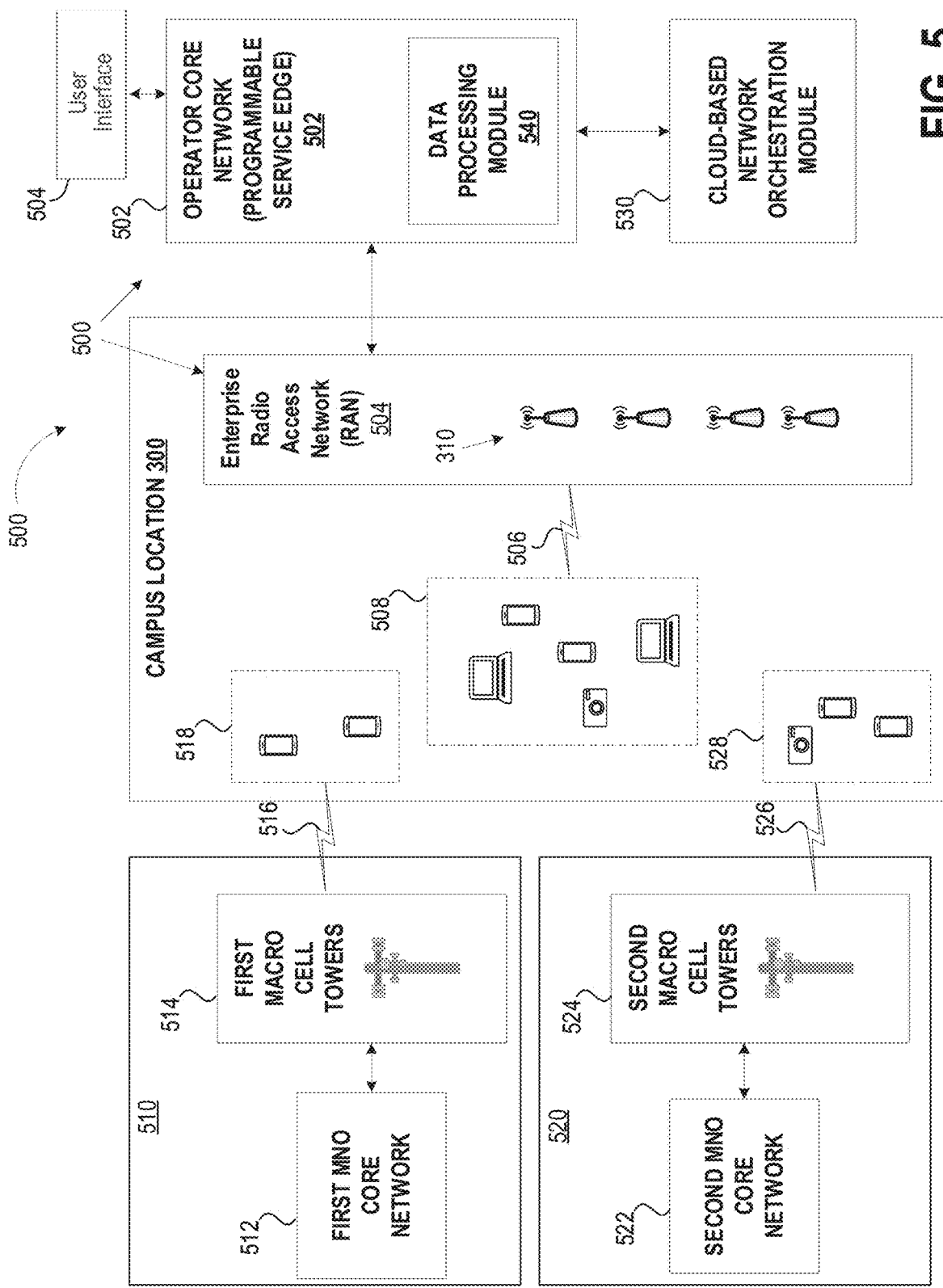
FIG. 5 is a block diagram of an Enterprise Network that provides wireless coverage on the campus location, and a Mobile Network Operator (MNO) Network that has wireless coverage on at least part of the campus location.
Figure 6:
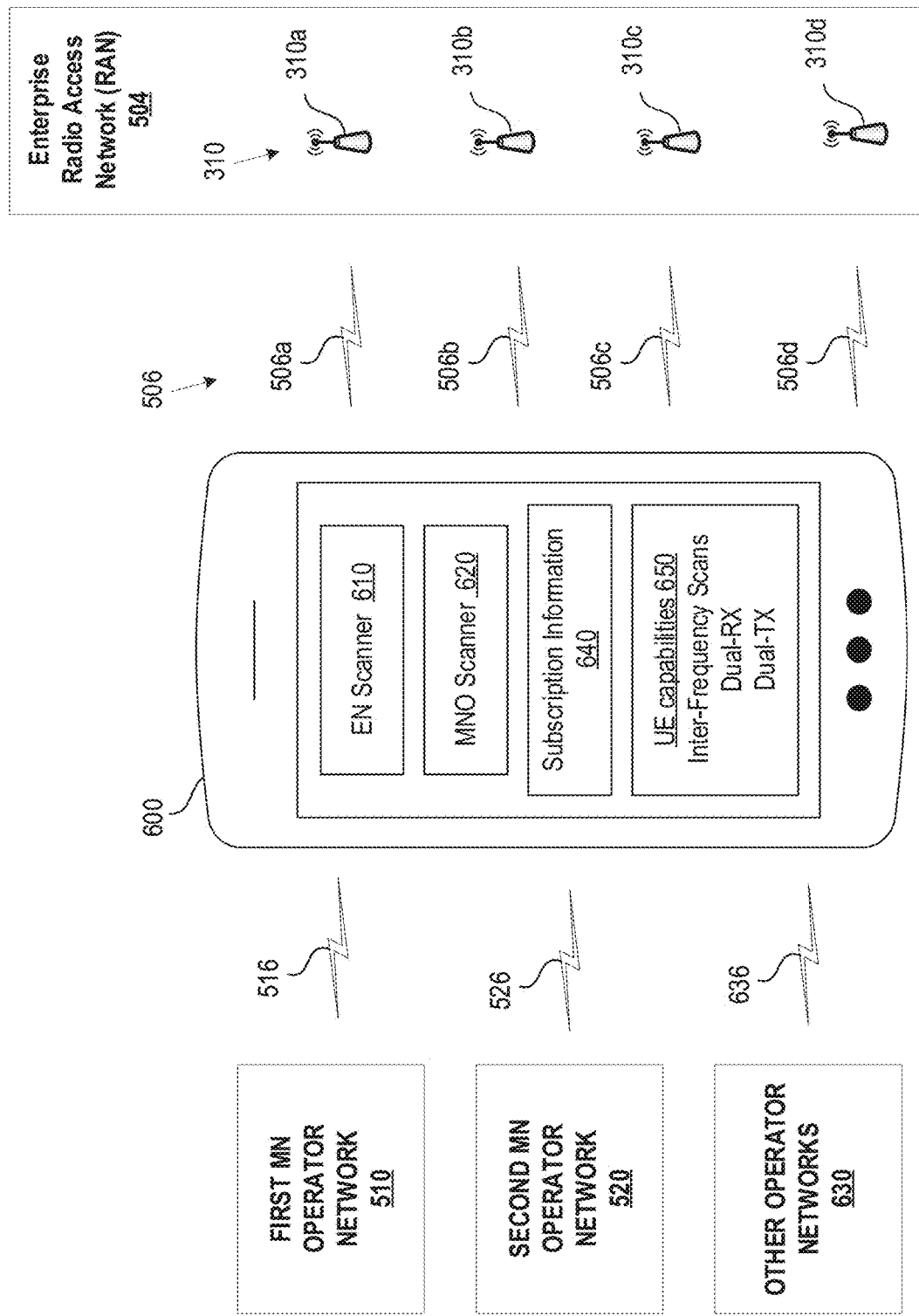
FIG. 6 is a diagram of a mobile phone, illustrating functional components that can be utilized as one of the UEs on the campus location.

Although described in the context of an enterprise wireless communication network, the principles disclosed can also apply to any private wireless network that has a campus in which wireless coverage is provided by external wireless providers (PSPs), within at least some region of the campus.
(2) Campus Location, Wireless Coverage, EN and MNO FIG. 3 is a perspective illustration of a campus location 300 that has wireless coverage. FIG. 4 is a cross-sectional view of a building 400 on the campus location 300. FIG. 5 is a block diagram of an Enterprise Network 500 that provides wireless coverage on the campus location 300 and an MN Operator (MNO) Network that has wireless coverage on at least part of the campus location 300. FIG. 6 is a diagram of a mobile phone 600, illustrating functional components that can be utilized as one of the UEs on the campus location 300. The following discussion refers collectively to FIGS. 3, 4, 5, and 6.

FIG. 3 is a perspective illustration of a campus location 300 in which a plurality of BS/APs including at least a first BS/AP 310a, a second BS/AP 310b (collectively 310) of an Enterprise Network (EN) 500 are installed to provide wireless coverage to a plurality of mobile users such as a first user 320a a second user 320b, and a third user 320c (referred to collectively as 320). Each mobile user 320 may be carrying one or more UEs such as a mobile phone, laptop computer, or some other device that can be connected to the EN 500.

The campus location 300 defines a boundary perimeter 302, and the BS/APs 310 are deployed within the boundary 302. The positions and configuration of the BS/APs 310 deployed within the campus location 300 are selected to provide wireless coverage to the plurality of users 320 for the Enterprise Network (EN) 500. The BS/APs 310 may be installed indoors and outdoors, and may comprise any type of BS/AP. The BS/APs 310 generally provide wireless coverage substantially throughout the campus location 300, indoor and outdoor, with coverage usually extending to surrounding areas at least to some extent. In one embodiment the BS/APs 310 comprise CBSDs and the EN 500 includes a CBRS network. In some embodiments some of the BS/APs 310, particularly the BS/APs installed indoors, have a UE built into them. These built-in UEs can be used for making measurements that can be used to determine the MN footprint information, as described herein.

In addition to the wireless coverage at the campus location provided by the BS/APs 310 (of the EN 500), there may be other, external networks that provide wireless coverage, at least to some extent, in some regions of the campus. For purposes of description, these external networks will be referred to as Macro Networks (MNs). Often, this other coverage is provided by large well-known mobile networks operators (MNOs), using relatively high-power signals from antennas on the top of tall Macro Network (MN) towers such as a first tower 330a, a second tower 330b, a third tower 330c, a fourth tower 330d, and a fifth tower 330e (collectively 330) that may be located some distance outside the campus location 300. Although usually the MN towers 330 are located outside the campus location 300, in some cases one or more MN towers (possibly smaller cell towers) may be located within the campus boundaries 302. Each of the MN towers 330 may be utilized by one MNO or by two or more MNOs.

Within any campus location 300, the RF environment can vary due to a variety of causes. Physical obstacles like buildings 341, 342, and 400 affect the RF environment, also the relative positioning of the transmitters and UEs, interference, campus layout, features, and building construction: walls, materials, carpeted/non-carpeted all can affect the RF environment and may vary widely between locations. Some of the RF effects are unchanging (static), but others, such as interference can change over time. This variation in RF environment can cause wireless coverage variations that can adversely affect the EN's ability to provide adequate service to the UEs throughout the campus location. Complicating the EN's role in providing adequate service are issues such as variations in types of users (UEs), device types, types of services operating on the network, times of usage, grades of services, and network loading in general.

Figure 7:
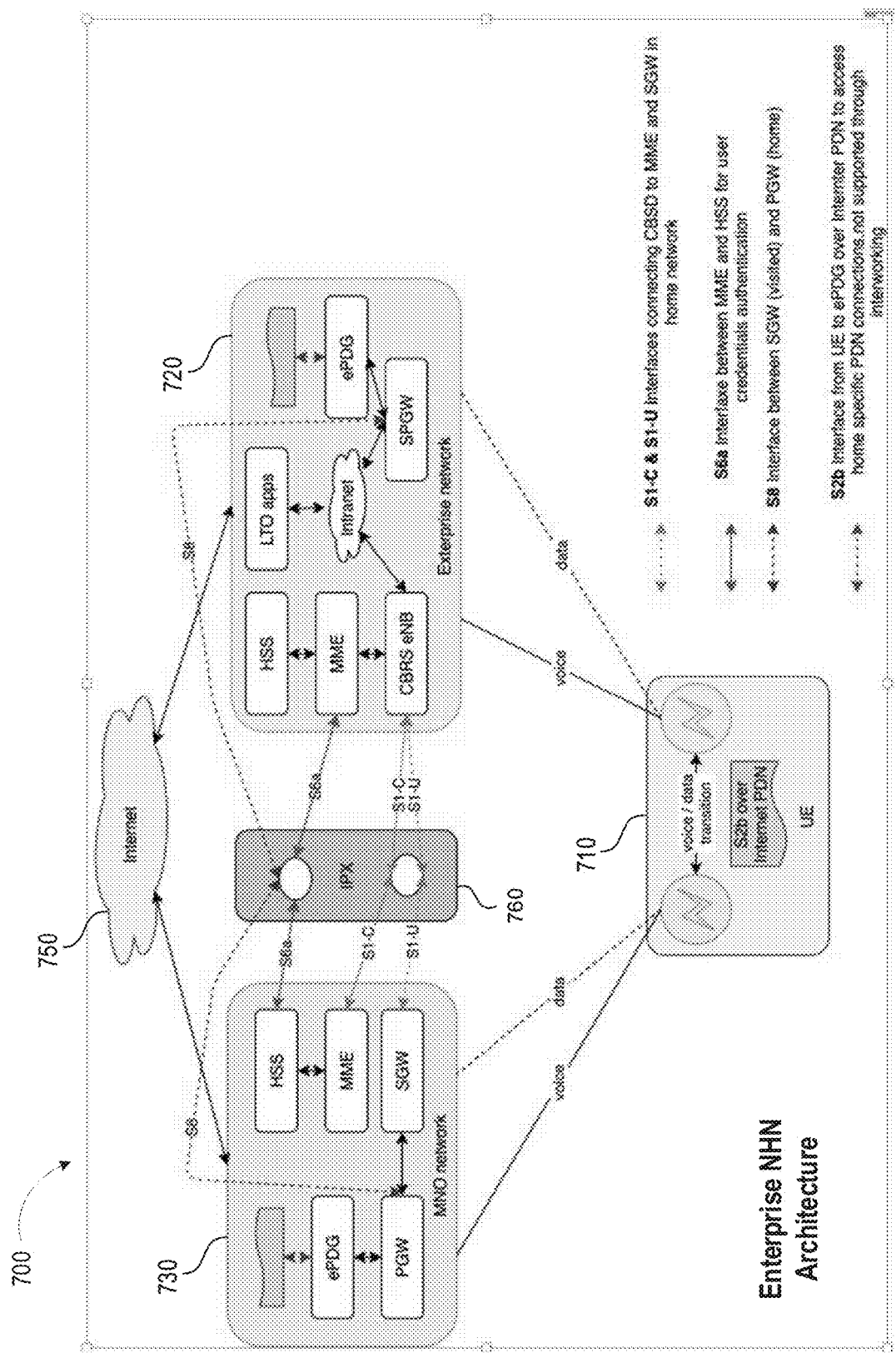
FIG. 7 is a block diagram of one example of a Neutral Host Network (NHN), which is an interconnected network configuration that allows a UE to connect with an MNO network via the EN.

Regarding MNO networks, although their wireless coverage can extend a long distance from the higher-power MN towers 330, the RF environment of the campus location 300 also affects MNO wireless coverage within the campus, particularly within buildings. To address this issue, MNOs have developed partnerships with ENs that provide for interworking with their MNO networks. A Neutral Host Network (NHN), one example of which is shown in FIG. 7, provides interworking between an EN and one or more MNOs, allowing a UE to connect to the MNO through the EN, which allows the MNO to be treated as a home network even though the UE is connected to the EN. Generally, an NHN is an enterprise network that allows UE devices to connect to an MNO through established business arrangements with the MNO.
(3) In-Building Wireless Coverage FIG. 4 is a cross-sectional view of a building 400 on the campus location 300 in which a plurality of BS/APs of the RAN of the EN 500 are installed on different floors. In this example, a first BS/AP 410a is installed on the sixth floor 406, a second BS/AP 410b is installed on the fourth floor 404, a third BS/AP 410c is installed on the first floor 401, and a fourth BS/AP 410d is installed in the basement 409. As discussed previously, it is very unlikely that the MN signals from the towers 330 will penetrate to the basement 409 as well as the interior of the building 400, and therefore the installation of BS/AP 410d in the basement and the interior of the building can be very useful to extend coverage. In some embodiments, the indoor BS/APs 410 have a UE built into them. These UEs can be used for making measurements that can be used to determine the MN footprint information.

(4) EN and MNs on a Campus Location

FIG. 5 is a block diagram that shows a first MNO network 510, a second MNO network 520, and an EN 530 all providing wireless coverage to a plurality of UEs on the campus location 300. The UEs are grouped in the block diagram by the network to which they are connected: a first group of UEs 518 is wirelessly connected to the first MNO network 510, a second group of UEs is wirelessly connected to the second MNO network 520, and a third group of UEs is wirelessly connected to the EN 530. The placement of the UEs on the block diagram of FIG. 5 is intended to show the UEs' wireless connections wherever they may be on the campus, and does not necessarily represent their physical position in the campus location.

The first MNO network 510 includes a first MNO Core Network 512 connected to a first group 514 of MN towers such as the first MN tower 330a and the second MN tower 330b that wirelessly connect via a wireless link 516 to UEs in the first UE group 518. The second MNO network 520 includes a second MNO Core Network 512 connected to a first group 514 of MN towers such as the third MN tower 330c and the fourth MN tower 330d that wirelessly connect via a wireless link 516 to UEs in the first UE group 518. The MNO network towers may include macro cells, outdoor CBRS, indoor CBRS, and the MNO networks may be traditional large mobile carriers, a CBRS system, or others.

The EN 500 includes a radio access network (RAN) 504 that includes the plurality of BS/APs 310 wirelessly communicating with a plurality of UEs including the third UE group 508 over a wireless link 506. As described earlier, the BS/APs 310 are installed in the campus 300. The RAN 504 may also include other functional components, some of which may be on the campus 300, and others may be located externally, such as in the Core Network 502. The placement of the BS/APs 310 on the block diagram of FIG. 5 is intended to show wireless, as connections wherever they may be on the campus, and does not necessarily represent the BS/APs' physical position in the campus location.

The EN 500 also includes an Operator Core Network 502 (also called a Programmable service edge or "PSE") that provides a variety of services for the network, which is described in more detail with reference to FIGS. 8 and 9. The BS/APs in the RAN 504 are connected to, and operated and controlled by, the EN Operator Network 500. Some of the RAN services may be provided by the Core Network 502. A User Interface 504 is provided and connected to the Core Network 502 for administration. In some embodiments the EN 500 also includes a cloud-based network orchestration module 530 that provides administrative services, databases, and other functional units such as machine learning and artificial intelligence units.

(5) UE Capabilities

FIG. 6 is a diagram of a mobile phone UE 600, which is one example of a UE carried by users 320 on the campus location 300. Mobile phones have many capabilities; the diagram of FIG. 6 illustrates some of the functional components that can be utilized in one or more of the UEs. Generally, as the users travel through campus location 300, the plurality of mobile UEs measures signals from the plurality of BS/APs, and the mobile UEs also measure one or more wireless signals from the plurality of MNs that it can detect.

The UE 600 includes frequency scanners that look for wireless signals, and if found, measure signal qualities such as the Reference Signal Received Power (RSRP). As shown in FIG. 6, an MNO scanner 620 in the UE 600 scans appropriate frequencies and looks for wireless signals 516 from the first MNO Network 510, looks for wireless signals 526 from the second MNO Network 526, and looks for wireless signals 636 from other operator networks 630. If any of these signals are found, then signal qualities are measured.

A EN scanner 610 in the UE 600 scans EN-RAN bands for wireless signals 506 from the BS/APs 310 in the RAN 504. Particularly, the EN scanner 610 looks for wireless signals from all the BS/APs, and measures signal qualities from those within its range. In FIG. 6, the UE 600 looks for a first wireless signal 506a from a first BS/AP 310a, a second wireless signal 506b from a second BS/AP 506b, a third wireless signal 506c from a third BS/AP 310c, and a fourth wireless signal 506d from a fourth BS/AP 310d. Any of the signals 506 that are detectable are measured by the UE 600.

The UE 600 also maintains subscription information 640 for all the networks that it can connect to. Each UE 600 has subscription information 640 that gives it access to one or more of the MNOs, the EN, and other operator networks 630 to which it is subscribed. If the UE 600 detects a signal from a network, and if the UE 600 is a subscriber to that particular network, the UE 600 may request admission (i.e., entry) to the network using the credentials in the subscription information 640, and if authenticated, then the UE 600 can be admitted. UEs typically have service subscriptions with one or more wireless networks. The subscriptions can belong to any Macro (or Mobile) network operator (MNO), a Multiple System Operator (MSO), Mobile Virtual Network Operator (MVNO) (collectively termed MNOs herein) or a private enterprise network operator. Each UE in the EN can also have a subscription with one or more MNOs that may also have coverage on the campus, which presents an opportunity to offload some or all of the services being provided to a UE by the EN to an MNO, and vice versa, if it can be determined whether or not coverage exists in the area where the UE is operating.

As mentioned above, any UE can have many capabilities that are implemented in functional units. Each UE can have different capabilities, and it can be useful for a network to know the capabilities of the UEs to which it is connected. Therefore, each UE 600 can provide a description of its capabilities 650 to a requesting network. Examples of such capabilities 650 are dual-RX, dual-TX, and inter-frequency scans.

(6) Neutral Host Network (NHN)

FIG. 7 is a block diagram of one example of a Neutral Host Network (NHN) 700, which is an interconnected network configuration that allows a UE to connect with an MNO network via the EN 500. An EN (and more generally any deployed network) that can accommodate users with subscriptions from different operators, and the UE treats these networks to be same as their home network is considered to be an NHN. Any given MNO network (MN) and enterprise network (EN) can be enabled to act as an NHN. The home network operators that allow for connectivity into the neutral host networks may be called Participating Service Providers (PSP).

The NHN of FIG. 7 is connected to a UE 710 that has capabilities to connect to either an EN 720 or an MNO network 730. The UE 710 can separate voice communications from data communications, so that voice may be communicated over the MNO network 730 while data may be communicated over the EN 720, for example. Both the EN 720 and the MNO network 730 are connected to the Internet 740, and therefore the UE 710 can connect to the Internet 740 through either network.

The EN 720 and the MNO network 730 are connected via an appropriate network interface such as the IPX interface 760 and bearers S8, S6a, S1-C and S1-U. IPX refers to Internetwork Packet Exchange which is a network layer protocol that may also act as a transport layer protocol.

A central concept of an NHN is sharing deployed network components; for example, by routing the MNO call through the EN, many resources are effectively shared: antennas, access networks, transmission, Spectrum, RF Design/Planning, and Core Network. Advantageously, this sharing can effectively extend the coverage of the MNO networks.

One of the key aspects that allows for the network sharing is spectrum. For example, as discussed elsewhere, the FCC opened the CBRS band to the public defining specific procedures for how to acquire part of the spectrum for localized use. Given this spectrum can be used by any of the network operators both public and private, this creates a certain ecosystem of end user devices and networks that can support offload. This offload to the NHN based on the business agreement can be aggressive to accommodate immediate transfers or conservative to serve as a coverage extension when the footprint for the home network operator is poor or non-existent. An NHN can be used for offloading UEs, for load balancing congested scenarios. In the context of congestion control, offloading the UE could include transferring the UE between the EN and the MNO within the NHN (i.e., not using the MN cell towers).

(7) Enterprise Network Diagram

Figure 8:
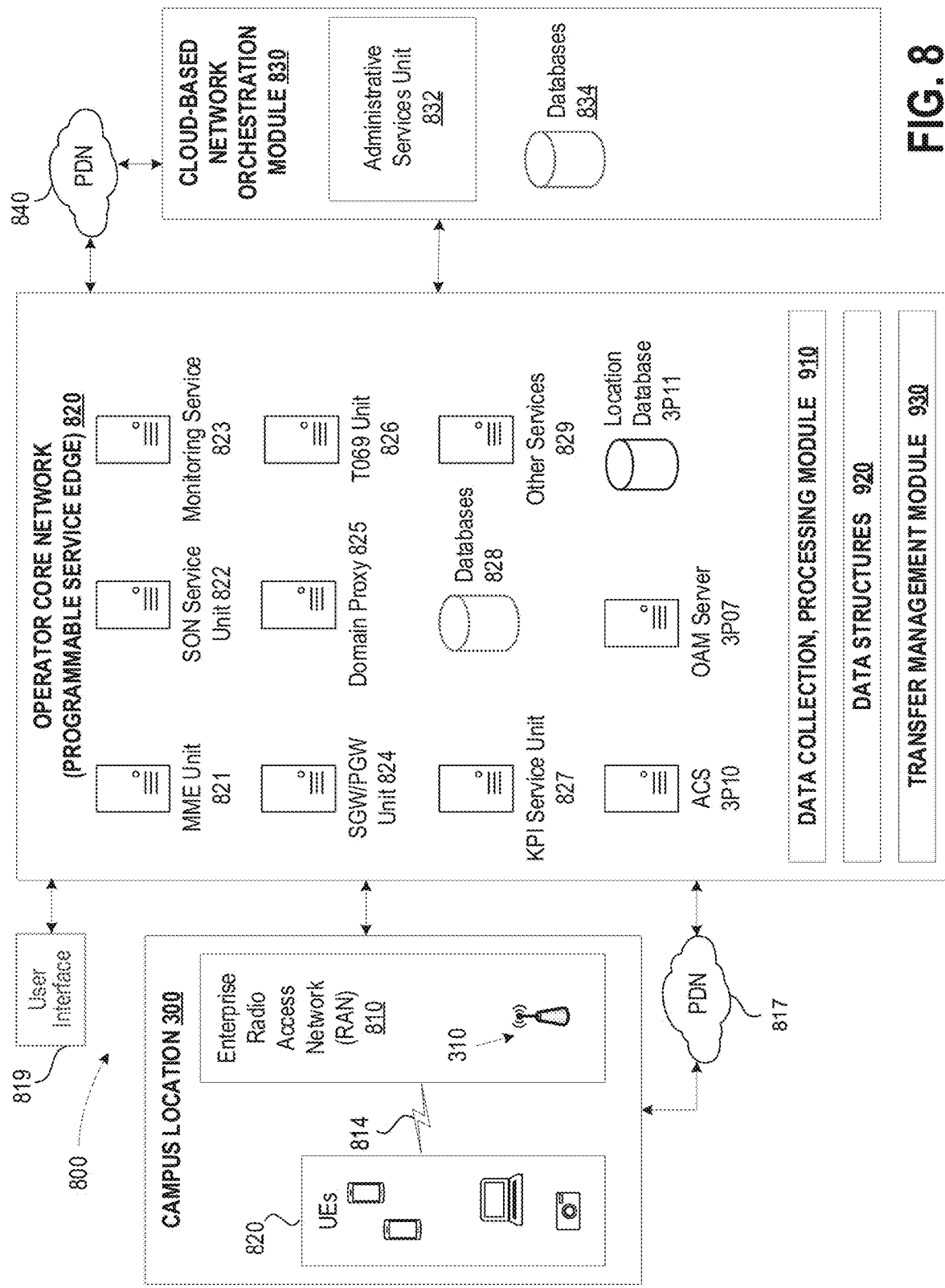
FIG. 8 is a block diagram of an implementation of an Enterprise Network (EN).
Figure 9:
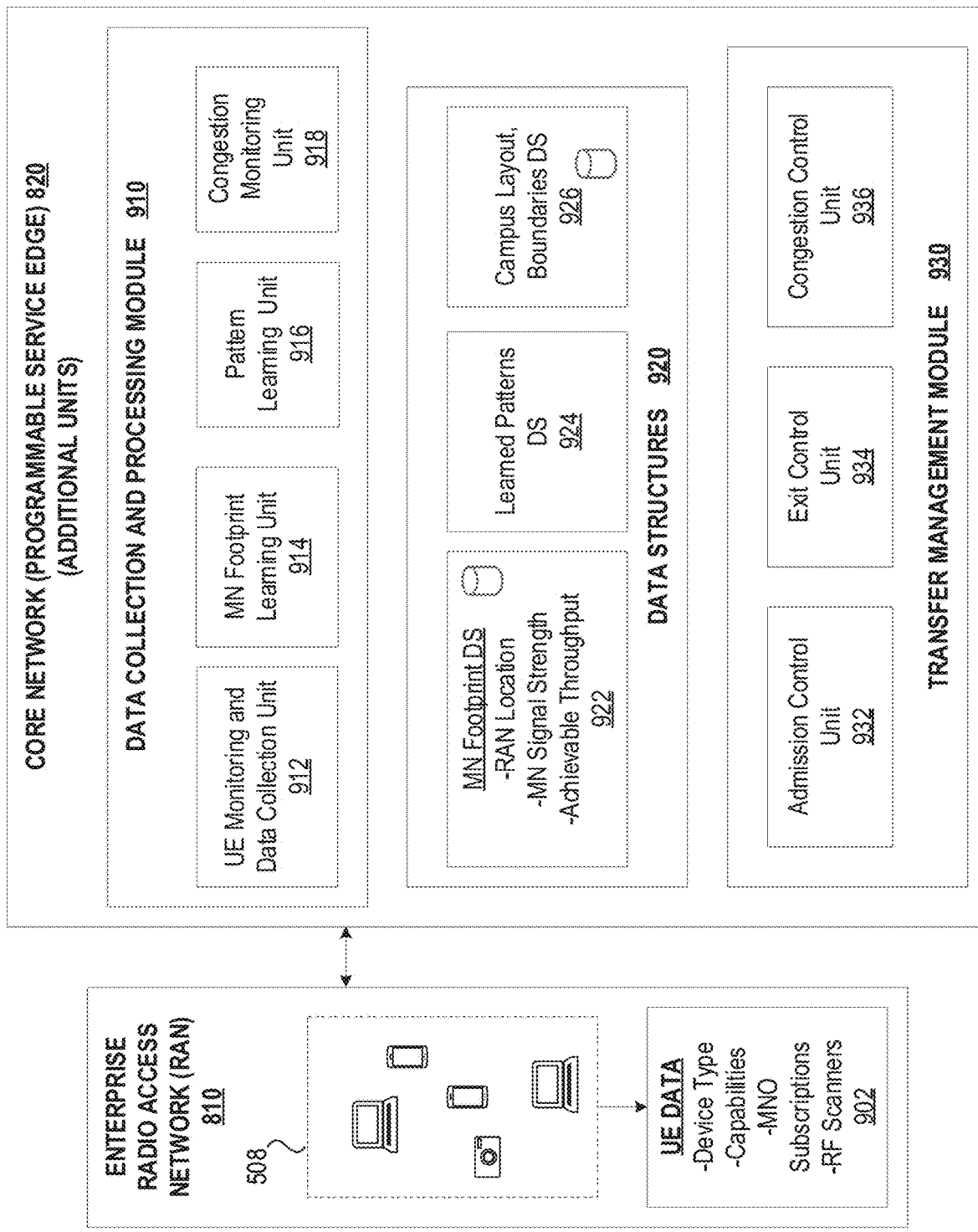
FIG. 9 is a block diagram illustrating additional components of the EN of FIG. 8, including a Data Collection and Processing Module, Data Structures, and a Transfer Management Module.

FIG. 8 is a block diagram of an implementation of an Enterprise Network (EN) 800, and FIG. 9 is a block diagram illustrating particular components of the EN 800. The following discussion refers collectively to both FIGS. 8 and 9.

The EN 800 includes a Radio Access Network (RAN) 810 comprising a plurality of BS/APs 310 that are wirelessly connected to a plurality of UEs 802. The RAN 810 is connected to an Operator Core Network 820 by any suitable connection. For example, all the BS/APs 310 in the RAN 810 may be connected to a Packet Data Network (PDN) 817 by any appropriate communications means, such as wire, fiber optic, and wireless radio, which is then connected to the Core Network 820. The BS/APs in the RAN 504 are connected to, and operated and controlled by, the Core Network 820. Some of the RAN services may be provided by the Core Network 820. The RAN 810 provides wireless connection and services to a plurality of UEs on the campus location 300. A user interface 819 is provided and connected to the Core Network 810 for administration of the EN 800.

In an enterprise network deployment, the BS/APs 310 and elements of the RAN 810 will be located on the campus location 300, and it is very likely that the Core Network 820 will be physically located at or near the enterprise location, especially in large or multiple deployments in the same area. However, for smaller deployments, or for multiple small deployments, it may be more cost effective to physically locate the Core Network remotely from the enterprise location.

In some embodiments the Core Network 820 is connected to a Network Orchestration module 830 that may include an Administrative Service Unit 832 for remote administration of the enterprise network, databases 834, other components as may be necessary or useful, and other functional units such as machine learning and artificial intelligence units. The Orchestration Module 830 is connected to the Core Network 820 by any appropriate communications means, such as a PDN 840. Generally, the Network Orchestration Module 830 supports the Core Network 820 and can provide additional services.

The Core Network 820 (which may also be called a Programmable service edge or "PSE") provides a variety of services for the EN 800 using a plurality of components connected to each other by any appropriate means. In the illustrated embodiment of FIG. 8, the components include a MMF (Mobility Management Function) unit 821, a SON (Self Organizing Network) service unit 822, a monitoring service unit 823, an SGW/PGW (Serving Gateway/Packet Data Network Gateway) unit 824, a domain proxy 825, a TR069 unit 826, a KPI (Key Performance Indicator) service unit 827. The core network 820 may also include databases 828 such as a Location Database and others, and other units for additional network services 829 as required or useful, such as an Operations, Administration, and Maintenance (OAM) Server and an Automatic Configuration Server (ACS).

The Core Network 820 also includes units described with reference to FIG. 9, including a Data Collection and Processing Module 910, Data Structures 920, and a Transfer Management Module 930.

Communication networks and system components may be described herein using terminology and components relating to 4G, 5G, and CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band and the BS/APs comprise CBRS devices (CBSDs) that are located at a campus location.

(8) Additional Core Network Units

FIG. 9 is a block diagram of the Core Network 820 shown in FIG. 8, and including additional component units. As in FIG. 8, the Core Network 820 is connected to a RAN 810 that is wirelessly connected to a plurality of UEs 508. The additional units are grouped into a Data Collection and Processing Module 910, a Data Structures 920, and a Transfer Management Module 930. All these units and modules are interconnected by any appropriate network structure.

The Data Collection and Processing Module 910 includes a UE Monitoring and Data Collection Unit 912, an MN Footprint Learning Unit 914, a Pattern Learning Unit 916, and a Congestion Monitoring Unit 918.

The Data Structures (DS's) 920 include an MN Footprint DS 922, a Learned Patterns DS 924, and the Campus Layout and Boundaries DS 926.

The Transfer Management Module 930 includes an Admission (UE Entry) Control Unit 932, an Exit Control Unit 934, and a Congestion Control Unit 936.

The UE Monitoring and Data Collection Unit 912 is connected to the RAN 810 to receive UE Data 902, from the UEs 508. The UE Data 902 includes any relevant UE data such as device type, UE capabilities, MNO subscriptions, RF scanners, and RAN location. The UE Monitoring and Data Collection Unit 912 requests and receives all this information, and collects it to make it available for reference and for further processing. The UE Monitoring Unit is connected to the Transfer Management Module 930 to supply UE information to the Admission Control Unit 932, the Exit Control Unit 934, and the Congestion Control Unit 936.

Figure 10:
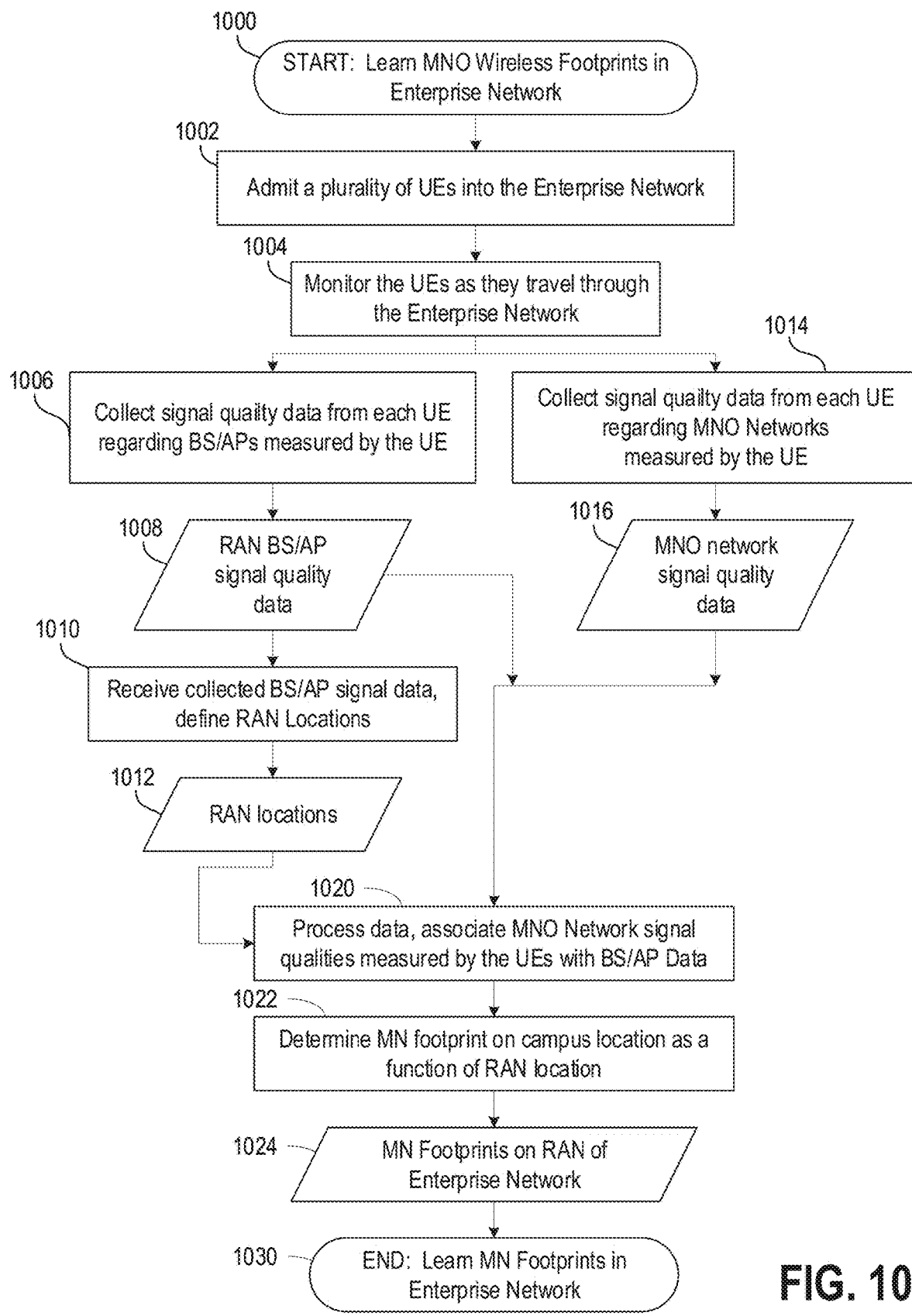
FIG. 10 is a flowchart of operations of one embodiment to learn the wireless MNO Network (MN) footprint within (and around) the campus location for each MNO Network as a function of a RAN location.

The MN Footprint Learning Unit 914 contains circuitry to learn the MN footprint of all the MNO Networks operating on or around the campus location. One embodiment is illustrated in FIG. 10 and described therewith. The MN footprint learning unit 914 may include machine learning and other AI circuitry to learn the footprint. The MN Footprint Learning Unit 914 stores the MN footprints in the MN Footprint DS 922, from which it is made available to the units in the Transfer Management Module 930.

The Pattern Learning Unit 916 learns exit patterns and stores them in the Learned Patterns Data Structure (DS) 924. The Exit Control Unit 934 is connected to the Patterns DS 924 to receive pattern data. The Pattern Learning unit 916 may include machine learning and other AI circuitry to learn exit patterns.

Figure 11:
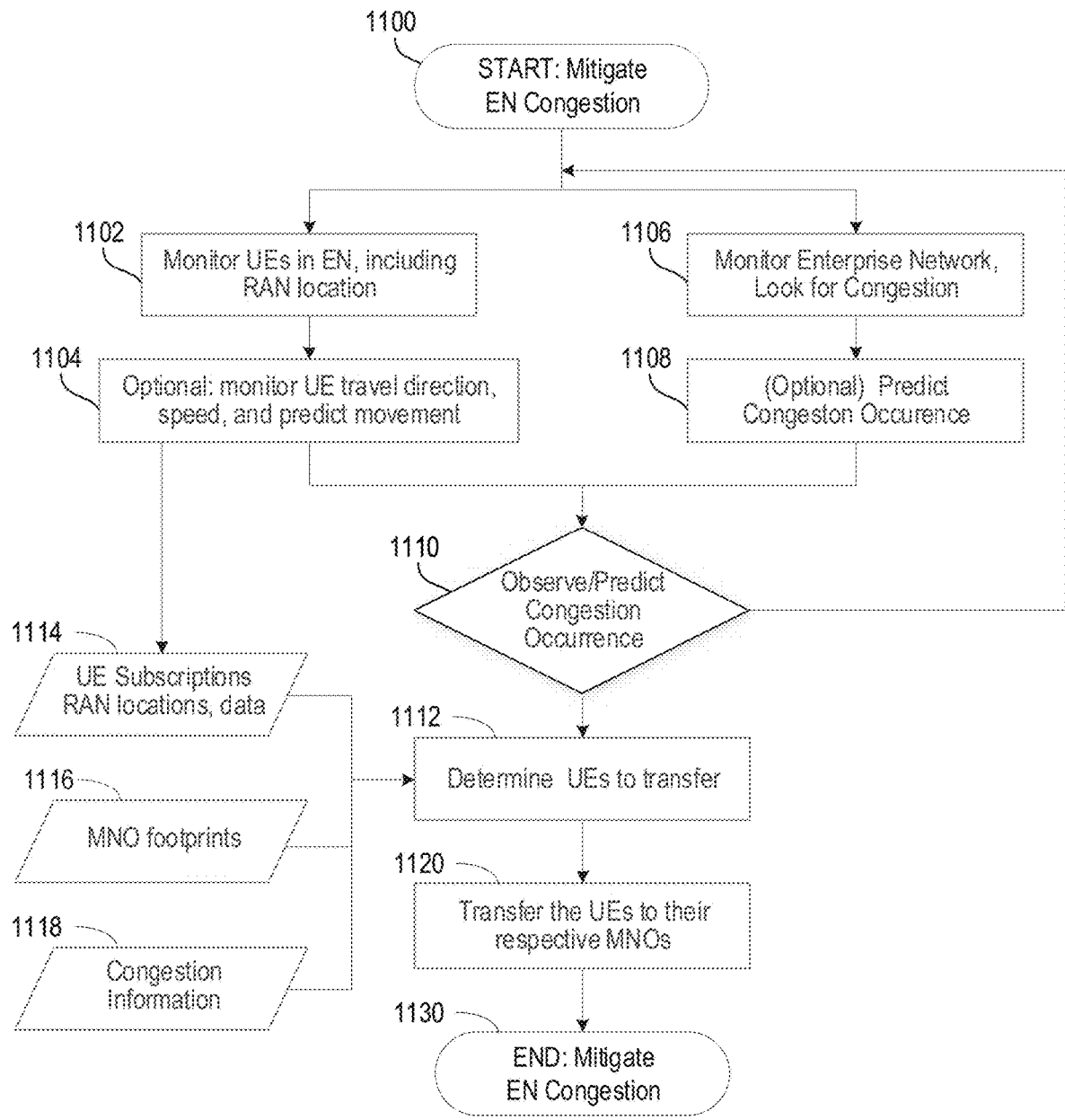
FIG. 11 is a flow chart of operations to mitigate congestion in an EN that has coinciding wireless coverage with MN Networks on its campus location.

The Congestion Monitoring Unit 918 is connected to the UE Monitoring and Data Collection Unit 912 to receive UE data, and determine congestion in the EN, such as shown in FIG. 11.

The MN Footprint DS stores the footprints of each of the MNO Networks that have some coverage on the campus location as a function of RAN location. The MNO information stored can include signal strength (e.g., RSRP) and achievable throughput.

The Learned Pattern DS is connected to store patterns from the Pattern Learning Unit 916 and supply them to the Exit Control Unit 934.

The Campus Layout, Boundaries DS 928 stores information regarding the layout of the campus, its boundaries and other relevant features regarding the campus.

Figure 12:
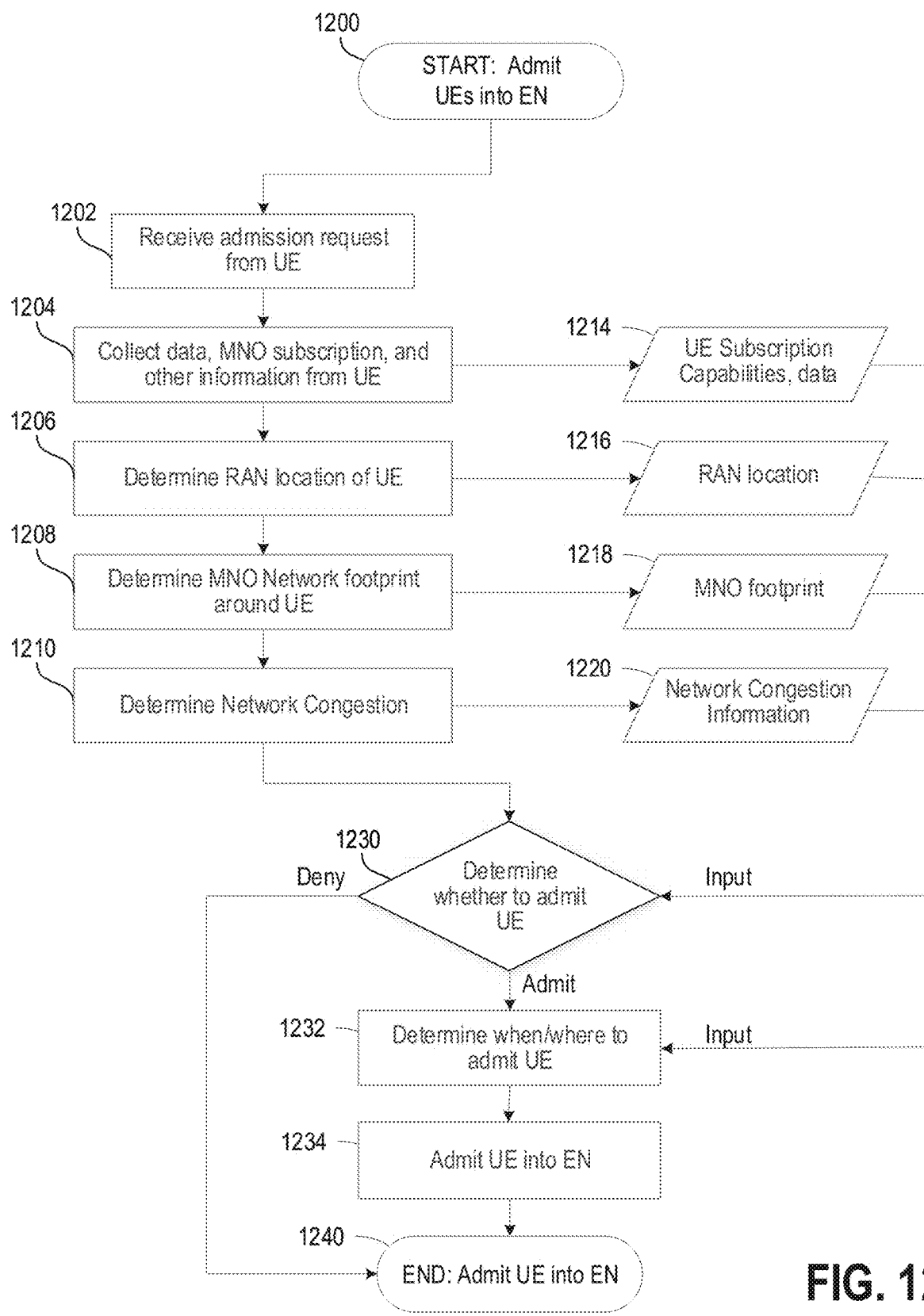
FIG. 12 is a flow chart of operations to admit a UE into the EN.

The Admission Control Unit 932 includes circuitry to control admission of UEs into the EN. It is connected to receive UE data from the UE Monitoring and Data Collection Unit 912, congestion information from the Congestion Monitoring Unit 918, and MN Footprints from the MN footprint DS 922, and may operate as shown in FIG. 12 and described in related text.

Figure 13:
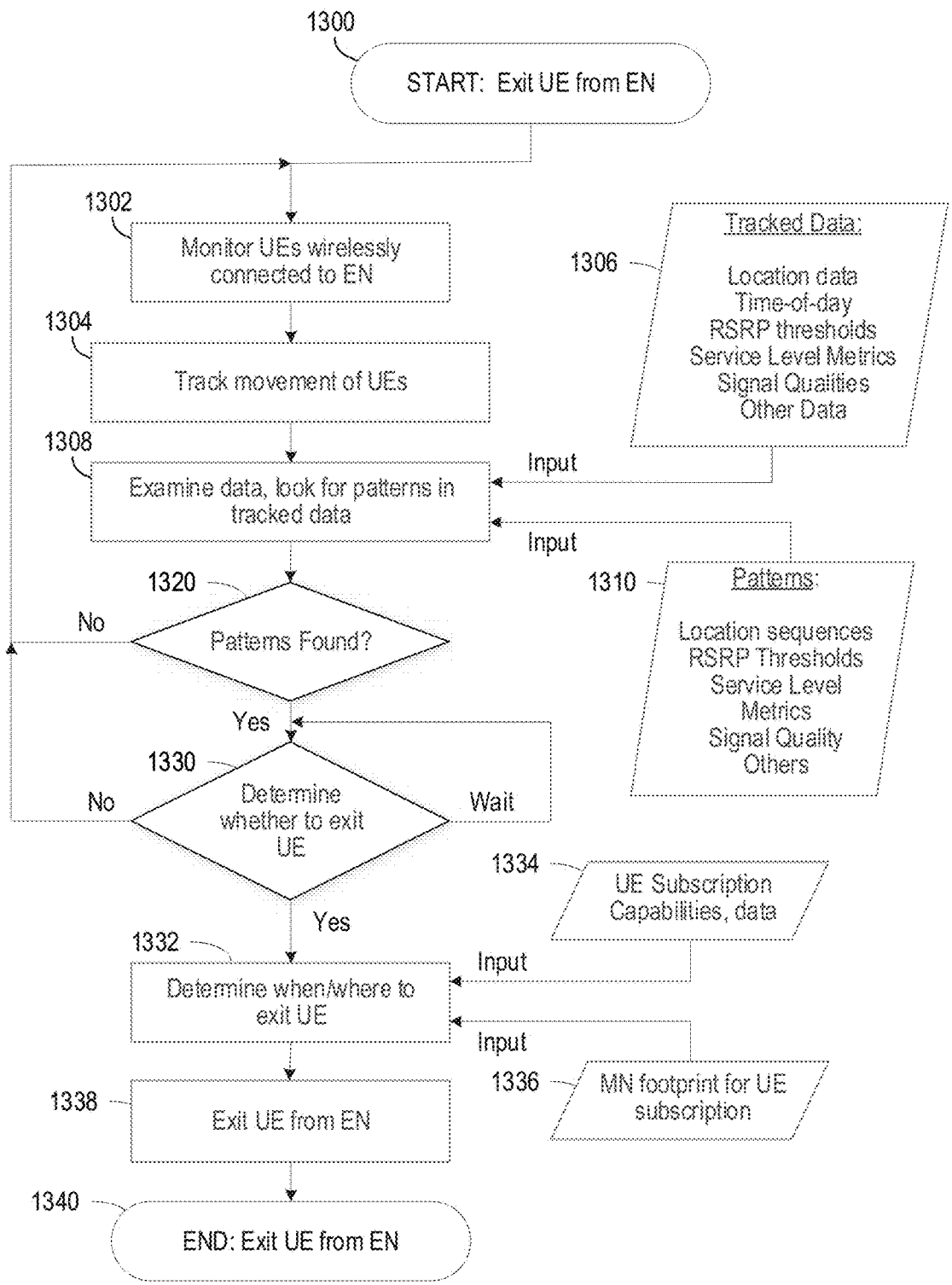
FIG. 13 is a flow chart of operations to exit a UE from the EN.

The Exit Control Unit 934 is connected to receive exit patterns from the Learned Patterns DS 924, and to receive UE data from the UE Monitoring and Data Collection Unit 912, and may operate as shown in FIG. 13 and described in related text.

The Congestion Control Unit 936 is connected to receive UE data from the UE Monitoring and Data Collection Unit 912, congestion information from the Congestion Monitoring Unit 918, and MN Footprints from the MN footprint DS 922. The Congestion Control Unit 936 may operate as shown in FIG. 13 and described in related text.

(9) Quality of Service (QoS)

Quality of Service (QoS) relates to communication qualities that may be assigned by a network to a UE for use during a communication session across the network. Different applications have different requirements, and in order to provide an appropriate level of service for different applications, the radio control system must have the capability to vary QoS quantities in order to provide the appropriate QoS. QoS selection allows the radio control unit to assign different priorities to packets of different applications, users, or data flows, or to guarantee a certain level of performance to a data flow.

QoS can be defined by a combination of one or more quantities such as a required bit rate, delay, delay variation, packet loss, or bit error rates. The radio controller may guarantee a particular QoS for a particular application; for example, a required bit rate, delay, delay variation, packet loss, or bit error rates may be guaranteed. An appropriate QoS is important for any wireless service, particularly real-time streaming multimedia applications such as voice over IP, multiplayer online games, and IPTV, since these often require fixed bit rate and are delay sensitive. Furthermore, QoS is especially important in networks where the capacity is a limited resource, for example in cellular data communications.

A network or protocol that supports QoS for its users may agree on a traffic contract with the application software and reserve capacity in the network nodes, for example during a session establishment phase. During the subsequent session the network may monitor the achieved level of performance, for example the data rate and delay, and dynamically control scheduling priorities in the network nodes.

(10) Artificial Intelligence

Artificial Intelligence (AI) techniques may be utilized herein. One definition of the AI field is the study of "intelligent agents" which include any devices that perceive their environment and take actions maximizing their chances of successfully achieving their respective goals. The term "artificial intelligence" describes machines (or computers) that have learning and/or problem-solving capabilities.

"Automated planning and scheduling", sometimes referred to as simply "AI planning", is a branch of artificial intelligence that develops and implements strategies or action sequences, for execution by, for example, intelligent agents, autonomous robots, and unmanned (self-driving) vehicles. Unlike classical control and classification problems, the solutions are complex and are typically discovered and optimized in multidimensional space. AI planning may also be related to decision theory. In known environments with available models, AI planning can be done offline. Solutions can be found and evaluated prior to execution. In dynamically unknown environments, the strategy often needs to be revised online. Models and policies must be adapted. Solutions usually resort to iterative trial and error processes commonly seen in artificial intelligence, which may include dynamic programming, reinforcement learning and combinatorial optimization. Languages used to describe planning and scheduling may be called action languages.

"Data mining" as used herein is a broad term for mining the data for information, utilizing exploratory data analysis through unsupervised learning and recognition of patterns. The patterns found by data mining may be easily observable by rote learning and memorized, repeated occurrences, or they may be much more complicated. Machine Learning (ML) is a more specific type of data mining in which the patterns to be recognized may be hidden and difficult to find.

Machine learning (ML) is the study of computer algorithms that improve automatically through experience. It is seen as a subset of artificial intelligence, and there are many types and methods of machine learning, any of which can be implemented herein as appropriate. Methods of machine learning include classification, regression, and clustering, and others. Classification machine learning methods may build a model based on sample data, known as "training data", in order to make predictions or decisions without being explicitly programmed to do so. Regression methods fit the data to a curve or function. Clustering methods use techniques to find a centerpoint and define clusters (e.g., placing dots on a screen to define a number and size of clusters).

"Deep learning" is a subset of machine learning. In one implementation multi-layered neural networks—modeled to work like the human brain—'learn' from large amounts of data. Within each layer of the neural network, deep learning algorithms perform calculations and make predictions repeatedly, progressively 'learning' and gradually improving the accuracy of the outcome over time. In the same way that the human brain absorbs and processes information entering the body through the five senses, deep learning ingests information from multiple data sources and analyzes it in real time.

In summary, machine learning is a subfield of artificial intelligence. Deep learning is a subfield of machine learning, and neural networks make up the backbone of deep learning algorithms. The number of node layers, or depth, of neural networks distinguishes a single neural network from a deep learning algorithm, which may have more than three node layers.

(11) Learning MN Footprint

The RF (Radio Frequency) environment of individual campus deployments can vary widely from campus-to-campus and can be difficult or impossible to predict. RF environmental variations can be caused by a wide range of factors; some variabilities include campus layout, features, building construction, walls, materials, and whether the floors are carpeted or non-carpeted. For example, at any location in the RAN, the signal strength may be only partially related to distance of the BS/AP from the UE, but many other factors may come into play. For example, a particular BS/AP that has a clear path to the UE may have a more powerful signal strength than another BS/AP that is physically closer, but blocked by objects such as walls, floors, or other obstacles. Learning the MN footprint and selectively transferring the UEs between the EN and MNO, provides an EN with an ability to adapt its wireless network to the RF environment on its individual campus location.

FIG. 10 is a flowchart of operations of one embodiment to learn the wireless MNO Network (MN) footprint within (and around) the campus, for each MNO Network, as a function of a RAN location of the EN. The MN footprint includes not just the location but also the extent of coverage in terms of the signal strength and achievable throughput in the different locations of the campus. Some of these operations may be performed in the UE Monitoring and Data Collection Unit 912, and the MN Footprint Learning Unit 922.

After the start (STEP 1000) a plurality of UEs 600 are admitted into the EN (STEP 1002). Each of these UEs 600 provides data about itself to the EN, such as shown in FIG. 6: its scanning ability (MNO scanner 620), its subscription information 640, and other UE capabilities 650. In embodiments in which the BS/APs have a UE built into them, these UEs may be admitted (if necessary or useful) and provide data about themselves to the EN.

The UEs are monitored as they travel through the EN (STEP 1004), and data is collected regarding the wireless environment is collected as the UE travels through the campus. In embodiments in which UEs are built in to the BS/APs, data measurements regarding the wireless environment are also collected from theses built-in UEs, which are stationary. This data is collected by the EN (STEP 1006), which uses the data to manage the EN, including the RAN and UEs in it.

Particularly, as each UE travels through campus, it typically can detect and measure the RSRP (Reference Signal Received Power), or some similar measure, of multiple BS/APs as it scans for EN signals, and this information can be provided via the RAN to the UE Monitoring and Data Collection Unit 912. Because each scan by each UE scans and measures the BS/APs signals within a short period of time, the measurements in each scan can be considered as having been received at approximately the same time and same location, given the typical relatively slow rate of movement of the UEs on the campus. Thus, the measurements from each scan can be considered to be a "location" in and around the campus location. Thus, the BS/AP signal quality data (DATA 1008) received is collected from each UE regarding the BS/APs measured by the UE (STEP 1010), and used to define RAN locations (DATA 1012). The data collected from various UEs providing data may be combined using appropriate data processing techniques such as artificial intelligence techniques to provide a group of standard RAN locations that can be used as a consistent reference for the MN footprints. RAN locations are used to define a wireless "location" from the perspective of the RAN and the BS/APs in it. In this sense, the "location" defined by RAN locations is not defined in geographical terms as a geo-location, rather it is defined by the relative strength of the BS/APs in the RAN as measured by a UE at that position. In some circumstances and EN embodiments, the EN may provide wireless coverage outside the boundary perimeter of the campus location. In that situation, a UE in the EN, traveling outside the boundary perimeter, would still be collecting measurements of the BS/APs in the EN even though outside the boundary perimeter, and in that case the RAN location would correspond to a physical location outside of the campus location, but still be part of the EN.

Referring to STEP 1014, at or about the same time as the EN BS/APs are being scanned, the MNO scanner 620 in the UE is scanning for signal quality data regarding MNO Networks, and measuring signals it can detect. Particularly, as the UE is scanning (with the MNO scanner 620) for MNO Network signals, it may be able to detect and measure the RSRP (Reference Signal Received Power), or some similar measure, of one or more MNOs as it scans. Any detected MNO Network signals and their measurements are provided to the UE Monitoring and Data Collection Unit 912 and collected there (STEP 1014), which provides MNO Network signal quality data (DATA 1016).

The RAN BS/AP signal quality data (DATA 1008), the RAN locations (DATA 1012) and the MNO network signal quality data (DATA 1016) are than processed (STEP 1020) and utilized to determine (STEP 1022) an MN footprint (DATA 1024) for each MNO that has some wireless coverage on the campus location. Generally, MNO Network signal qualities do not vary over time in any significant way. However, it is possible in some circumstances that MNO Network signal qualities may vary over the day, and in that case it may be useful to observe and in some cases predict the signal variations and incorporate that into the MN footprint as a time dependency.

After the MN footprints have been determined for all the MNO that have some coverage on the campus location, operation then ends (STEP 1030).

(12) Managing Network and Transferring UEs

(13) Introduction

The MN footprints and RAN locations of the UEs can be utilized to effectively manage the EN in a number of ways. Congestion occurrences, observed or predicted, can be mitigated or even eliminated without undue service disruption by using the MN footprints to select particular UEs to transfer between the EN and the MNO Network. For example, under "high" congestion conditions, the MN footprint information and the RAN location of UE can used to select which UEs will be admitted into the system. By using the MN footprint and a UE's RAN location to determine when to transfer, the UE can be transferred between the EN and the MNO Network smoothly and efficiently. For example, when the UE requesting admission is in an area where the MN footprint is stronger and larger, then entry into the EN can wait for the UE to be in RRC idle state before attempting to transfer from MNO network to the Enterprise network, which advantageously allows for a smoother transition. By monitoring the UEs RAN location and movement, and knowing the RAN locations that are near or outside the boundaries of the campus, the UE's exit can be predicted, and communication can be transferred to the MNO Network proactively, or an appropriate time can be chosen (such as when the UE is in an idle state), or a location can be chosen where the MNO Network has a strong signal, to promote a smooth transfer from the EN to the MNO Network.

(14) Congestion Control

Network congestion in an EN can occur at any time of the day, and at any location on a campus location. Congestion can occur for a number of reasons; typically congestion is due to a large amount of wireless traffic that is sufficient to overload EN system resources. The congestion may be related to wireless coverage and the RF environment for example, it may relate to the number and types of users, the types and grades of services operating on the network, and device types. Regardless of the cause, network congestion is a problem for users and network administrators alike. Congestion issues are discussed in detail elsewhere in this specification, for example beginning with the section titled Overview of a Network Load Control System, and in the figures beginning at FIG. 14A, methods and apparatus for predicting and observing congestion, and responding to congestion, are described therein. A congestion occurrence may be observed or predicted using any appropriate technique, including the techniques described therein.

A congestion occurrence, observed or predicted, can be mitigated or even eliminated without undue service disruption by using the MN footprints to select particular UEs to transfer between the EN and the MNO Network.

FIG. 11 is a flow chart of operations to mitigate congestion in an EN that has coinciding wireless coverage with MN Networks on its campus location. After start (STEP 1100) the EN monitors (STEP 1102) the UEs in the EN, monitoring information such as the UEs' current RAN locations. The EN may also monitor (STEP 1104) the UEs' travel direction, speed, and predict their movement. At the same time, the EN monitors (STEP 1106) its network operations, including looking for a congestion occurrence. Also, based upon the current network operation and other factors such as history and time, the EN may predict (STEP 1108) a congestion occurrence in the future. The congestion occurrence may be limited to a particular area (e.g., a group of RAN locations), or it could affect substantially the entire network. The congestion occurrence may be time-limited and happen at a particular time, or may be predicted to happen at a particular time. Generally, the congestion occurrence can have any of a number of causes and have a variety of effects on the network. Operations stay in this state until a congestion occurrence is observed.

After a congestion occurrence is observed and/or predicted by the EN (STEP 1110), the UEs to be transferred are determined (STEP 412). Inputs (DATA 1114) to this determination include UE subscriptions, RAN locations, other UE data such as the capabilities of each UE, and the MN footprints (DATA 1116) such as described with reference to FIG. 11 which indicate the MNO coverage available at and around the UEs' RAN locations. Congestion information (DATA 1118) from the EN, provided from STEPs 1106 and 1108 is also suppled which indicates details of the congestion, such as extent and area of congestion. Responsive to this data and information, a determination is made (STEP 412) as to which UEs to transfer to their respective MNO Networks. The UEs to be transferred to the MNO Network may be those in or near the location of the congestion occurrence. UEs that are nearing exit may be transferred to the MNO, anticipating that they will soon be exiting the EN. Preferences for selecting the UEs to transfer may be given as described in the General Considerations section below.

After the determination is made as to which UEs are to be transferred, the EN then transfers (STEP 1120) those UEs to their respective MNO. The transfer is accomplished in any appropriate way: in some cases, the EN may communicate with the MNO to coordinate the transfer (see FIG. 7 and associated description, for example). In other cases, the transfer may be accomplished by the EN terminating the connection with the UE knowing that the UE can connect to the MNO, or the UE may be requested to terminate the connection with the EN and connect to the MNO Network. The UE device's capability information may be used to determine the transfer point (e.g., RAN location] and the type of transfer that is to be executed.

After the UEs have been transferred to their respective MNO, then operations end (STEP 1130).

(15) General Considerations Relating to Transferring UEs

The EN utilizes the MN footprints to select when and where to transfer UEs to and from the MNO Networks. Particularly each UE's RAN location, and the associated MN footprint (including the MNO's signal strength and extent of coverage around the UE's RAN location) are primary considerations when deciding whether or not to transfer the UE to an MNO Network.

ARP (Address Resolution Protocol) routing policies may be relevant in selecting the UEs for transfer.

The UE's capability for performing inter-frequency scans, dual-Rx, dual-Tx can also be utilized in selecting the UEs, because these capabilities may make it easier to perform the transfer, which would provide a smoother transfer, particularly for some device types. More generally, the ease with which transfer can be accomplished can be a factor in selecting the UEs to transfer.

As part of the EN's decision of which UEs to transfer, three perspectives (MNO, EN, UE) may be balanced.

MNO: From an MNO perspective, the MNO's preference is to offload calls and other communications to the enterprise network primarily when their own networks are providing poor coverage, or lack coverage for any of a number of reasons, such as lack of infrastructure, technical issues, or other issues. Otherwise, the MNO would usually prefer to keep the UE in its network. This preference may be for monetization purposes.

EN: From an enterprise network perspective, a primary importance is accommodating the users, subject to constraints of resource availability. In some implementations, and in the future, some monetization aspects may be available for the EN, but at the current time the EN primarily provides a service to the users building upon the enterprise's IT service dependability.

User (UE): From a user's perspective, service availability and dependability is of primary importance. Generally, a user wants a dependable connection (no dropped connections) that provides the type and speed of service needed, and preferably enhanced.

Generally, the MN footprints, the RAN locations of the UEs in the EN, and the MNO subscriptions of the UEs are used to determine which UEs that will be selected to transfer from the enterprise system and into the MNO network.

In some embodiments, an active use of Local Traffic Offload (LTO) services may be implemented to avoid moving certain UEs out of the system. Also, priority inversion will be required under specific conditions.

(16) Entry Control into EN

One aspect of EN operations relates to admitting UEs into its wireless network. The EN is not required to admit all UEs who request admission. In many cases the UE must have at least a subscription with the EN before being admitted, and the EN may refuse admission for other reasons. One reason to refuse admission is to mitigate network congestion: e.g., if a congestion occurrence is observed or forecast in the near future, admission may be denied in order to mitigate the congestion, or prevent the congestion from occurring or getting worse.

FIG. 12 is a flow chart of operations to admit a UE into the EN. At the start (STEP 1200) of the admission (entry) operations, it is assumed that the EN is operating and has wireless coverage on and around the campus location. When the UE is within the range of the EN wireless coverage, it makes an admission request which is received by the EN (STEP 1202). The EN collects (STEP 1204) data and other information from the UE, such its capabilities and the MNO (or MNOs) with which it has subscriptions, and provides this as DATA 1214. The EN then determines (STEP 1206) the RAN location of the UE and provides this as DATA 1216. The EN determines (STEP 1208) the MNO's footprint around UE's RAN location and provides this as DATA 1218. The EN may also have been monitoring network congestion as discussed elsewhere, and the congestion at this time, and predicted congestion may be determined (STEP 1210), and provides this as DATA 1220.

To determine whether or not to admit (STEP 1230) the UE into the EN, the decision receives input UE subscription information, UE capabilities, other data from the UE (DATA 1214), the UE's RAN location (DATA 1216), the MN footprint (DATA 1218), and Congestion Information (DATA 1220). Responsive to this input data, the EN makes a decision (STEP 1230) as to whether or not to admit the UE into the EN.

A number of considerations may enter into the admission decision (STEP 1230). An important consideration is network congestion, another consideration may be the relative priority of the UE in the EN. One technique to mitigate congestion is to control admission of UEs into the EN, which prevents the system from becoming more overloaded, or in the case of a predicted congestion occurrence, controlling admission may prevent the congestion from occurring in the first place. When a congestion occurrence is predicted or observed, (e.g., under "high" congestion conditions), the MN footprint information and the RAN location of the UE can be used to select which UEs will be admitted into the system.

If the EN determines not to admit the UE, then the request is denied, and the admission operation ends (STEP 1240). If the EN determines to admit the UE, then the next step is to determine (STEP 1232) when to admit the UE. Also, the UE to wait until it arrives at a particular location before entering the EN. By using the MN footprint and the UE's RAN location to determine when to transfer, the UE can be transferred between the EN and the MNO Network smoothly and efficiently. For example, when the UE requesting admission is in an area where the MN footprint is stronger and larger, then entry into the EN can wait for the UE to be in RRC idle state before attempting to transfer from MNO network to the Enterprise network, which advantageously allows for a smoother transition.

(17) Exit from EN

When the UE is exiting the campus location with active service with the Enterprise Network, the campus location's wireless footprint will eventually be lost, and therefore an effective mechanism to transfer the UE to an MNO network will be required. One objective of the transfer mechanism from the UE's perspective may be to make the exit transfer happen smoothly and seamlessly, another objective from the EN's perspective may be to enable a smooth transition, and also to reduce congestion in the EN.

FIG. 13 is a flow chart of operations to exit a UE from the EN. At start (STEP 1300) the EN is in operation, and a number of UEs, such as mobile phones, are wirelessly connected to the EN. The UEs are monitored (STEP 1302) to determine their RAN locations and other data, and their movements are tracked (1304) by the EN. In addition to location data, the data tracked (DATA 1306) can include any of time-of-day, RSRP thresholds of the EN's BS/APs and MNO cells (towers), service level metrics of PER, signal quality such as delay, jitter, and throughput, and the RSRP of MNO Networks. The tracked location data may include RAN locations and other location in other formats. For example, if other positioning systems are available to one or more of the UEs, such as a GNSS (GPS) system, those UEs may also provide their position to the EN in that format.

Each of the UEs is tracked. Each UE's movement data is examined (STEP 1308) to look for patterns 1310 suggesting that the respective UE will soon be exiting the EN. For example, the patterns 1310 may include inter-cell mobility sequences leading to specific EN BS/APs that are towards the extremities of the network. Other patterns 1310 may include time-of-day patterns; for example, near the end of the day, the UEs are more likely to exit. Also, RSRP threshold patterns of both Enterprise and MNO cells, service level metric patterns of PER, and signal quality patterns such delay, jitter, and throughput patterns may be examined.

Advantageously, transferring from the EN to the MNO can be done proactively upon detecting the pattern of the UE leaving the campus, rather than waiting for a "loss of coverage" event which could otherwise disrupt the UE's service.

The patterns 1310 may be developed by the EN, by collecting movement data of UEs in the EN over time, observing which UEs exit the EN after exhibiting the patterns, and using AI techniques to learn and predict an exit when a particular pattern is observed. Some patterns 1310 may include a knowledge of which BS/APs are near the boundary perimeter, and when a UE encounters any of these BS/APs, this may be an indication that the UE will soon exit the EN.

If patterns that sufficiently correlate with exit are not found (STEP 1320), then operation returns to continue monitoring the UEs (STEP 1302). However, if patterns are found for a particular UE, then operation moves to determine (STEP 1330) whether or not to exit that UE from the EN. In some cases, such as when there is little or no network congestion, the system may wait until more time passes to determine (STEP 1330) whether or not the UE will be exiting the system, and hold until then. If it is eventually determined not to exit the UE, then operation returns to continue monitoring the UEs (STEP 1302). However, if it is determined (STEP 1330) to exit the UE, then the next step (STEP 1332) is to determine when and/or where to exit (transfer) the UE to the MNO Network.

The UE device's capability information, its UE subscription (DATA 1334) and the corresponding MN footprint (DATA 1336) may be used to determine the transfer point (e.g., RAN location) and the type of transfer that is to be executed. This DATA 1334 and 1336 is available to the EN for each UE, as described elsewhere herein. Network congestion may also be a factor; in the presence of network congestion the UE may be transferred to the MNO sooner, rather than waiting.

After it is determined when and where to exit, the UE is exited (transferred) from the EN (STEP 1338). This transfer can be accomplished any of a number of ways, such as by communicating cooperatively with the MNO network and transferring the active RRC connection from the Enterprise to the MNO network. Another way of transferring is to abort the RRC connection on the EN, forcing the UE to go to RRC idle mode and transfer to the MNO network. In the latter case, before aborting, the EN should ensure that conditions are such that the entry criteria for the EN will not be met, to prevent the UE from re-entering the EN.

After the UE has transferred to its respective MNO, then operations end (STEP 1340).

(18) Overview of Network Load Control System

A system is disclosed herein for anticipating and controlling the load on the radio link in a wireless communication network. Some embodiments include a method of proactively controlling the wireless communication load in an enterprise network situated in a campus location that includes several BS/APs wirelessly communicating with at least one UE on the campus. One purpose of load control is to provide appropriate service to all UEs attached to the BS/APs in the network. Particularly, data is collected over time, the busy hours (times) in the day are recognized (in one embodiment they are recognized as a time series of events), predictions are made regarding when busy times are likely to occur (or when the time series of events happen), and resources are allocated proactively, such as re-allocating transmit power among the BS/APs, and restricting QoS grants to the UEs to allow more users to be supported in the system.

As described herein, data is collected on a BS/AP basis (i.e., for each BS/AP) to identify the peak time periods, and more generally traffic variations over time, observed at each BS/AP. Predicted heatmaps, as a function of time and/or as a time series of events, are identified using ML techniques; particularly ML) methods, such as deep learning are performed to develop predicted heatmaps associated with regions of the campus. Also, the peak time periods and traffic variations over time tend to reflect the trends of population movement on the campus, and from these population movements, ML techniques are used to estimate the ability to defuse communication congestion by offloading traffic to neighboring BS/APs or other networks that may be available, such as Mobile Network Operator (MNO) networks.

Also, the footprint of the enterprise's Wi-Fi network relative to the BS/APs in the enterprise network and the loading on that system can be monitored to make a collective decision. Responsive to this information, AI Planning techniques can be applied to determine pre-emptive steps to prevent users from attaching to the enterprise network, possibly direct them to the Wi-Fi network, and therefore reduce the possibility of overloading.

Artificial Intelligence (AI) systems are implemented, based upon any or all of the heatmaps, the estimated ability to defuse congestion by offloading traffic, and preemptive steps to prevent users from attaching to the enterprise network. The AI systems are implemented to monitor and anticipate congestion in the enterprise network, and respond proactively and appropriately using any of the techniques described herein to control the BS/APs and the network to reduce congestion or otherwise ensure that service needs of the UEs are met. Any or all of the AI techniques, including AI Planning, data mining, machine learning, and deep learning may be implemented and performed on site (on-line), or remotely (off-line); but preferably the AI modules are located on-site, where the enterprise network can learn its own patterns of behavior without requiring outside resources.

(19) Monitoring BS/AP Traffic Usage Over Time.

Figure 14A:
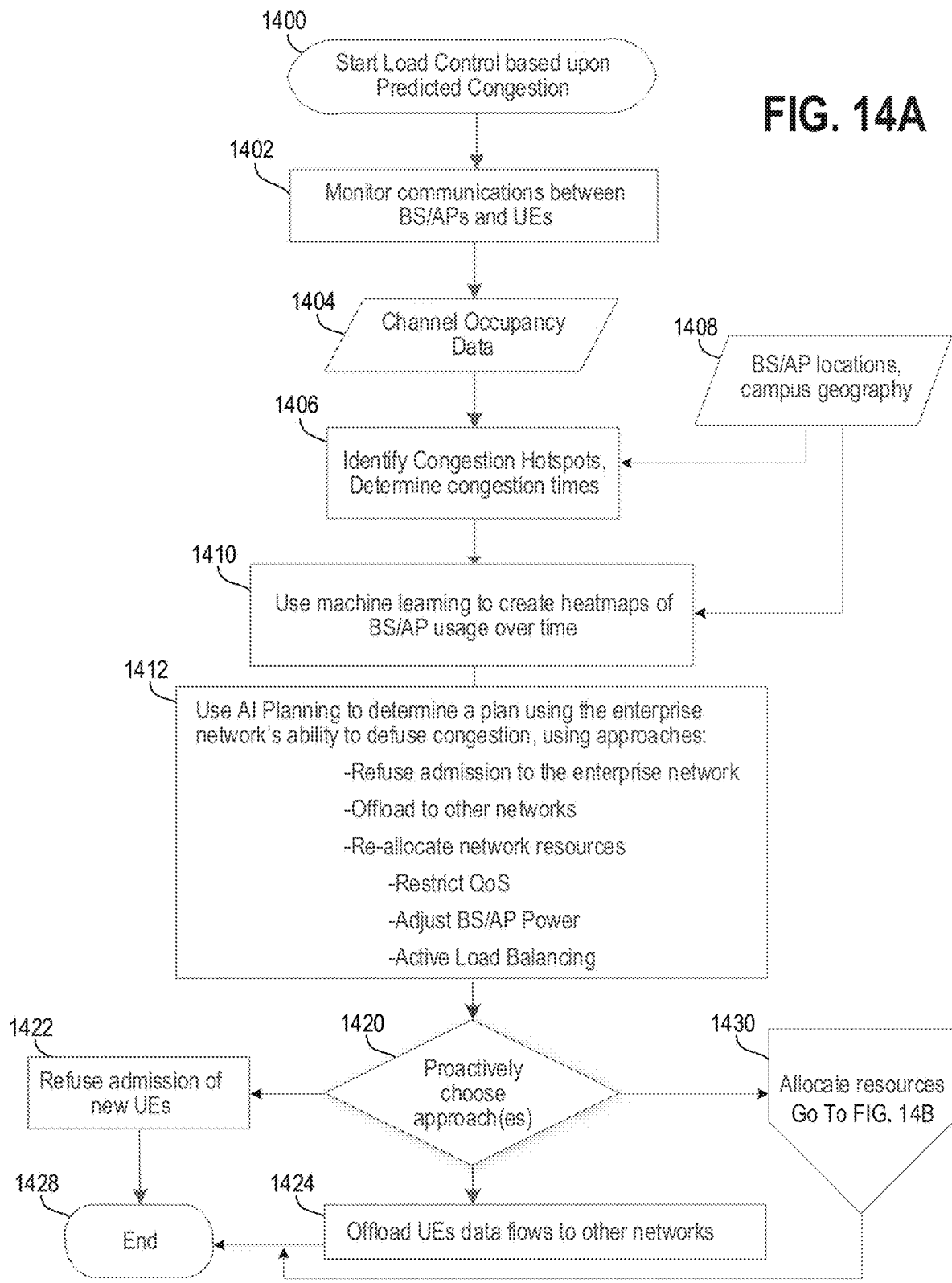
FIGS. 14A and 14B are flow charts that combine to show operations to learn busy times in a wireless communication network and anticipate and control the load on the radio link to provide service to the UEs attached to the BS/APs. Particularly.
Figure 14B:
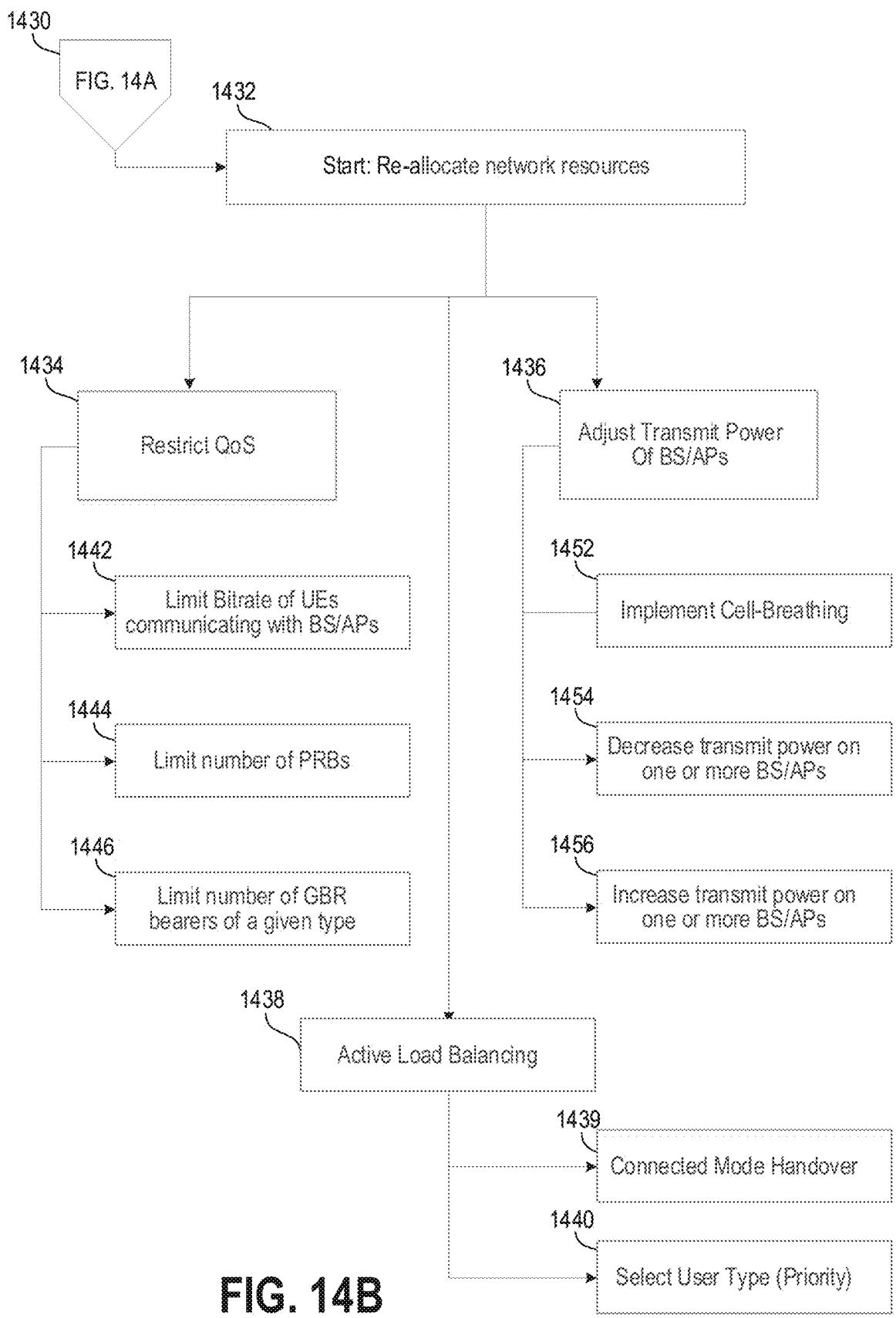

FIGS. 14A and 14B are flow charts that combine to show operations to learn busy times in a wireless communication network and anticipate and control the load on the radio link to provide service to the UEs attached to the BS/APs. After starting operations to control load, based upon predicted congestion (STEP 1400), the RAN, and more particularly in some embodiments each BS/AP begins monitoring communication traffic over a period of time to determine, among other things, usage and service data for the BS/APs 511 (STEP 1402). Particularly, the channel occupancy at each BS/AP can be measured. To measure channel occupancy, measurements can be made of the total Physical Resource Block (PRB) traffic at each BS/AP, and/or the PRB traffic with each UE, to determine the usage at each of the BS/APs in the network. The PRBs are defined according by the network architecture (e.g., in LTE a PRB is the smallest unit of resources that can be allocated to a user, which can be one slot long in time and 180 kHz wide in frequency).

The resulting channel occupancy data (DATA 1404) provided from the previous step can be collected over time for each BS/AP by monitoring the PRBs associated with each BS/AP at the RRC scheduler. The data is typically measured on a periodic basis with intervals short enough to capture whatever bursts of activity occur, without collecting excessive amounts of data. The interval can be selected based upon the particular deployment; for example, the intervals could be short (e.g. 30 seconds or 2 minutes) or longer (e.g., 10 minutes or one hour). The intervals should be short enough to capture and identify bursts of activity, such as the bursts of activity that occur between classes on a college campus.

In addition to the collected channel occupancy data, it can be useful to know the location of the BS/APs and the UEs, the geography of the campus and the placement of the BS/APs within the campus, the specifications (e.g., capacity) of each BS/AP, and other information relevant to communication usage and capabilities of the wireless network.

(20) Identify Congestion Hotspots (STEP 1406)

The channel occupancy data 1404 can then be used to identify congestion hotspots (STEP 1406). This can be done by analyzing the data and observing which of the BS/APs become congested, and at which times. The data can be analyzed using conventional AI techniques, such as AI planning to proactively re-allocate resources and balance the number of users with the level of service supported with the network resources available. Accordingly, data mining the channel occupancy data can be performed to identify congestion hotspots as a function of time. Alternatively, or in addition, ML can be used to predict heatmaps for individual BS/APs and to recognize demand patterns for services. Thus, the peak traffic time periods and other congestion can be identified on an BS/AP basis, as a function of day-of-the-week and time-of-day, and/or as a time-series of events. If the BS/AP locations and campus map (DATA 1408) is known, the identified congestion hotspots can be mapped on a geographical basis across the campus.

(21) Create Heatmaps of Usage Over Time (STEP 1410)

The channel occupancy data 1404, and any other relevant data (such as usage and service data) from monitoring the BS/APs, is processed (STEP 1410) using data mining, machine learning, and/or deep learning techniques to create heatmaps that include BS/AP usage and communication congestion across the campus as a function of time or a time-series of events. The data is processed responsive to the congestion identified and the population movement as a function of time based on the day-of-the-week and time-of-day. Particularly, using the BS/AP locations and campus map data 1408, heatmaps associated with regions of campus are generated that provide predictions showing where communication is likely to be adversely impacted by congestion, and the extent of that congestion as a function of time or as a time-series of events. In some embodiments, usage and service data includes location data, and the usage and service patterns include location in a time-series of events. In some embodiments, responsive to the congestion hotspots and the channel occupancy data, data mining is performed to create the heatmaps of BS/AP usage over time and to make congestion predictions as a function of time.

By observing the heatmaps sequenced over time, trends and patterns of population movement on campus can be seen, which may be repeated each day, or week, for example. These patterns may be useful in predicting congestion and proactively responding to it.

(22) Estimate the Ability to Defuse the Congestion (STEP 1412)

The information in the heatmaps, including the predicted congestion and population movement patterns over time are then processed (STEP 1412) using Artificial Intelligence (AI) techniques such as automated scheduling and planning (AI planning) to consider possible approaches by the wireless network and develop viable responses to proactively defuse the predicted congestion utilizing one or more of these approaches. In some embodiments, responsive to predicted congestion, artificial intelligence (AI) planning is used to determine a plan for the network to reduce the predicted congestion by at least one of re-allocating resources, refusing admission of new UEs, and offloading UEs to other networks.

Accordingly, one approach to defuse the predicted congestion is refusing admission of one or more UEs into the network. This approach, which denies service to UEs that may expect to connect to the network, is simple to implement in some situations, but may not be preferable in other situations.

Other approaches to defusing congestion may be available and can be considered. One approach to defusing predicted congestion is to allocate resources to a given BS/AP in a way that allows a larger number of UEs to communicate with the BS/AP. For example, in one embodiment, resources can be allocated to a given BS/AP by restricting, adjusting and/or controlling the Quality of Service (QoS) provided by the BS/AP to the UEs to which it is attached. The QoS may be adjusted for those BS/APs currently attached, and for those requesting services, the new QoS grants can be reduced to allow a larger number of UEs to communicate.

Another approach is to transfer the load from the center of congestion by adjusting the transmit power of the BS/AP and its neighboring BS/APs to offload currently-attached UEs to one or more of the neighboring BS/APs; particularly, to reduce the transmit power on one BS/AP and increase the power on one or more nearby BS/AP(s) to transfer a load from the predicted center of congestion. a technique that may be called "cell-breathing".

Another approach is to direct a handover of an attached UE from the BS/AP to a neighboring BS/AP, as part of an approach that is called "active load balancing". In this approach, a connected mode handover controlled by the network transfers communication of an attached UE from one BS/AP to another BS/AP, even though that transfer may lower the QoS. In some embodiments the load balancing approach is performed selectively based upon the user type, allowing for different behaviors. For example, higher priority users such as campus executors/administrators may be given a higher priority to stay on a BS/AP than a regular employee, a student, or a visitor. As another example, a user with a higher security level may be given a higher priority than one with a lower security level.

Still another approach is to offload specific user flows, or one or more IP address(es), or all traffic of some of the currently attached UEs from the enterprise network to another network, such as an available Wi-Fi network (which may be a WiFi network operated by the enterprise To offload to Wi-Fi networks, one or more of the UEs are (or have been) allocated an independent IP address, typically through DHCP (Dynamic Host Configuration Protocol), for data communication over the Wi-Fi network. The Wi-Fi assigned IP addresses generally support internet connectivity. The enterprise network PDN connections can be moved from the enterprise (LTE/NR) network to operate over the Wi-Fi assigned IP address as tunneled connections into the MNO (Mobile Network Operator) core. Traffic can be transferred between the IP address on enterprise (LTE/NR) to the one provided on Wi-Fi or the PDN connection established as IPSec (Internet Protocol Security) tunnels on top of the Wi-Fi IP address. More broadly, all traffic on a specific IP address may be transferred, or all traffic through a specific port can be transferred, or multiple IP addresses, or multiple ports may be transferred. Specific flows may be transferred, for example in streaming, the video flow may be transferred to WiFi, while the audio remains on the enterprise network. Many different types of data flows can be transferred (e.g., offloaded), such as voice, video, background traffic, streaming traffic, and IOT traffic. Accordingly, the UE may be communicating simultaneously with the enterprise network and the WiFi network.

Based upon the type of flow, a decision may be made whether or not to offload to a WiFi network based upon the type of service and QoS requirements, for example a voice call may be kept on the higher QoS enterprise network and video traffic may be offloaded to the WiFi network. As one example of transferring a flow, if the footprint of the Wi-Fi network is known, then based on the understanding the footprint of the Wi-Fi network relative to the BS/AP and/or UE, and the loading on that system, offloading the attached UE, e.g., by dropping the UE from the enterprise network, and anticipating that it is either currently attached to the Wi-Fi network, or will attach when dropped from the enterprise network. Particularly, the footprint of the Wi-Fi network relative to the BS/APs in the enterprise network and the loading on that system can be monitored to make a collective decision. Responsive to this information, ML techniques can be applied to determine pre-emptive steps to prevent users from attaching to the enterprise network, possibly direct them to the Wi-Fi network, and therefore reduce the possibility of overloading.

(23) Proactive Network Action

A network action is then chosen (STEP 1420) and is implemented proactively, i.e., at a time prior to the predicted congestion, for the purpose of reducing congestion and providing appropriate service levels to the UEs. The network action may include any of the approaches described herein, or a combination of the approaches. In other words, a collective decision (STEP 1420) is made regarding how to proceed, and this action is taken before the congestion is predicted.

After the decision (STEP 1420), in order to proactively control the network load and avoid service interruptions, the network can take action on any combination of the following: 1) take preemptive steps to prevent additional UEs from attaching to the enterprise network (STEP 1422), 2) offload data flows currently-attached UEs to other networks (STEP 1424), and 3) re-allocate resources among UEs already attached to the network (STEP 1430).

Offloading data flows (STEP 1422) may include offloading one or more data flows, or all traffic with the UE. It may include transferring one or more IP addresses, or one or more ports to the other network. It may include splitting an IP address between the enterprise network and the other network. After offloading some flows, the UE may be communicating with both the enterprise network and the other network.

Resource allocation operations (STEP 1430) are shown in FIG. 14B. At the start of resource allocation (STEP 1432), a decision made in the previous steps (how to allocate resources) will be implemented. Resource allocation has multiple mechanisms, any of which can be utilized, for example: 1) restricting the QoS of the wireless connections with the UE (STEP 1434), 2) controlling the transmit power of the BS/APs (STEP 1436) (e.g., cell-breathing), and 3) active load balancing (STEP 1438).

The step of restricting the QoS resource allocation for each BS/AP (STEP 1434) can be accomplished in a number of ways. The restrictions can be to limit:

the bitrate granted for a QoS bearer of certain type (STEP); for example, the bitrate can be restricted to 720 kbps;
the number of PRBs for a particular BS/AP (STEP 1444);
the number of GBR bearers of a given type (STEP 1446); or
the grants to the BS/APs.

Another way to allocate resources is to adjust BS/AP's transmit power (STEP 1436). The preferred mechanism to adjust BS/APs' transmit power is to allow for "cell-breathing" to regulate users camped on a BS/AP. Cell-breathing is a mechanism that allows overloaded BS/APs to offload subscriber traffic to neighboring BS/APs by changing the geographic size of the BS/AP's service area. One cell breathes in (transmit power reduces, footprint and coverage gets smaller) another cell breathes out (transmit power increases, footprint and coverage gets larger). Heavily-loaded cells decrease in size, while neighboring cells increase their service area to compensate for the decreased size of the heavily-loaded BS/APs. Thus, some traffic will be handed off from the overloaded BS/AP to neighboring BS/APs, to balance the load across the network.

Still another way to allocate resources is by active load balancing (STEP 1438) by the enterprise network to distribute the load and prevent service disruptions. Active load balancing operation includes a connected mode handover (STEP 1439) controlled by the network, in which communication of an attached UE is transferred from one BS/AP to another BS/AP, even though that transfer may lower the QoS. In some embodiments the load balancing approach is performed selectively based upon the user type (STEP 1440), allowing for different behaviors. For example, higher priority users such as campus executors/administrators may be given a higher priority to stay on a BS/AP than a regular employee, a student, or a visitor. As another example, a user with a higher security level may be given a higher priority than one with a lower security level The identified congestion hotspots, heatmaps, and restrictions, can be implemented across the full enterprise system, and/or for each cell in the system.

After the congestion period is over, the actions taken to address the congestion can end (STEP 1428), the network resources can be reallocated by the network, and new UEs can be admitted as appropriate for the network to provide appropriate service levels to the UEs to which the BS/APs are attached.

During operation, network performance and congestion are monitored to provide feedback to the AI system. Accordingly, by monitoring network operations to allow re-allocation of network resources proactively in response to usage and service patterns, congestion can be avoided, and appropriate service provided to several UEs. For example, new performance data can be compared and/or combined with the previous data and new learning can be performed. Also, reinforcement learning techniques can be implemented using the new data and historical data to improve the AI system and thereby improve network performance.

Figure 15:
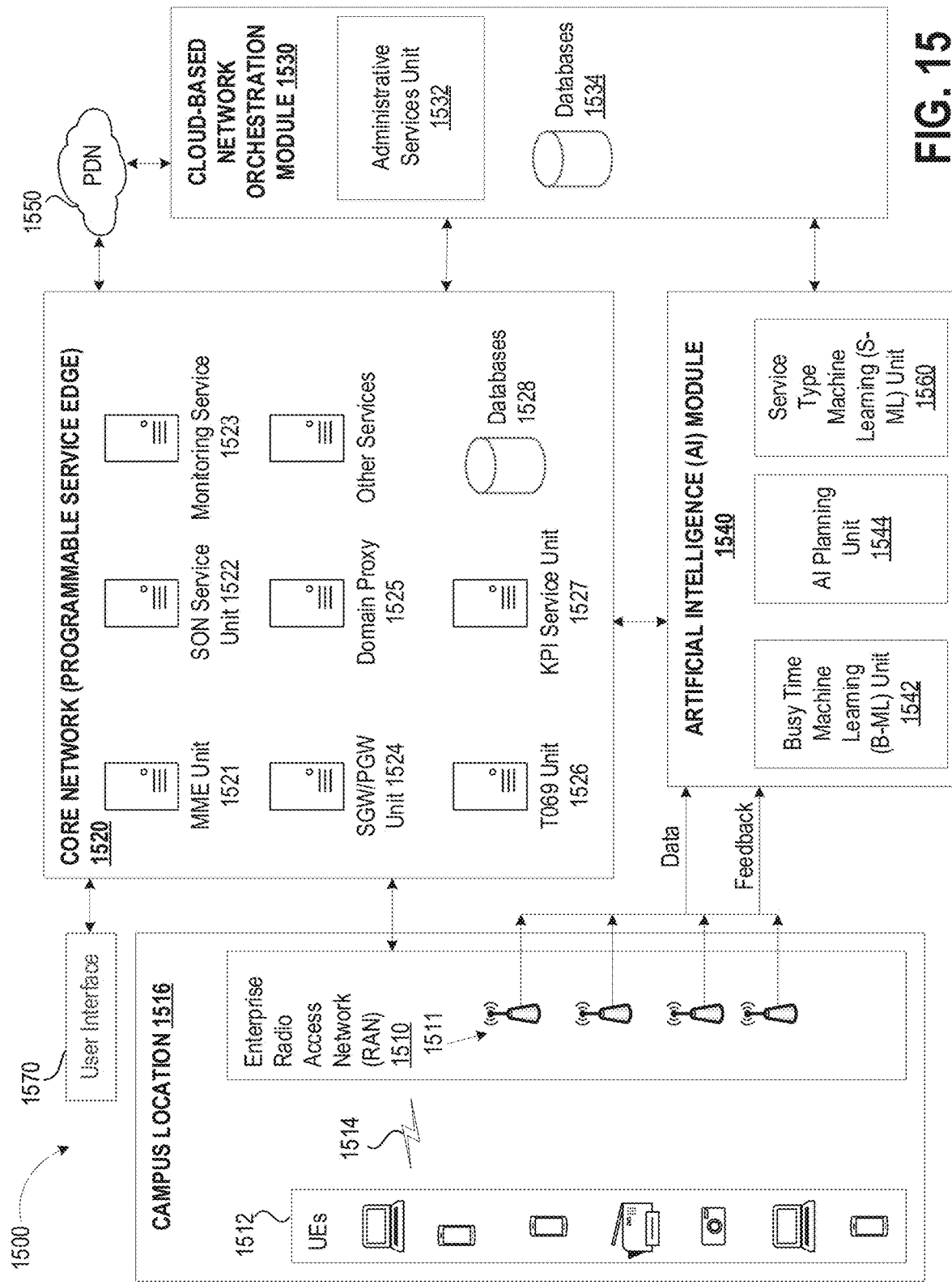
FIG. 15 is a block diagram of an implementation of an enterprise network that includes an Artificial Intelligence (AI) module, Machine Learning units, and an AI Planning unit.

(24) FIG. 15 Block Diagram

FIG. 15 is a block diagram of an implementation of an enterprise network 1500 that implements the techniques described herein. The enterprise network 1500 includes a radio access network (RAN) 1510 that includes a plurality of BS/APs 1511 that wirelessly communicate with a plurality of UEs 1512 over a wireless link 1514. The BS/APs 1511 are installed in a campus 1516, and the UEs 1512 are present in or around the campus 1516 to wirelessly communicate with one or more of the BS/APs 1511.

Data collected from the BS/APs 1511 is supplied to an Artificial Intelligence (AI) Module 1540 that includes a Busy Time Machine Learning (B-ML) Unit 1542 and an AI Planning Unit 1544. As discussed elsewhere, the data may include channel occupancy data, which is indicative of the load being experienced by the BS/APs 1511. Data can be collected in batches and history-based learning and/or ML techniques performed on the batch of data, and then implemented. Alternatively, or after initial learning using batches of data, data can be collected periodically or nearly continuously in real time, and learning and ML can be implemented automatically (e.g., 5-minute intervals) to continually improve the models and thereby continually improve network performance.

The AI module 1540, the B-ML Unit 1542, and the AI Planning Unit 1544 include appropriate circuitry to identify and learn busy time periods, consider options, choose actions, and determine when to perform the actions. AI systems are implemented, based upon any or all of the heatmaps, the estimated ability to defuse congestion by offloading traffic, and preemptive steps to prevent users from attaching to the enterprise network. The AI systems are implemented to monitor and anticipate congestion in the enterprise network, and respond proactively and appropriately using any of the techniques described herein to control the BS/APs and the network to reduce congestion or otherwise ensure that service needs of the UEs are met. The AI module 1540 is connected to the core network 1520, and supplies the results of its learning and other information the core network 1520, which in response directs and controls the BS/APs to proactively respond to predicted congestion.

The AI Module 1540 also receives feedback from the BS/APs 1511. Particularly, network performance and congestion may be monitored to provide feedback to the AI system. For example, new performance data can be compared and/or combined with the previous data and new learning can be performed. Also, reinforcement learning techniques can be implemented using the new data and historical data to improve the AI system and thereby improve network performance.

In the illustrated embodiment, the enterprise network 1500 includes a core network 1520 (also called a Programmable service edge or "PSE") that provides a variety of services for the network, and a cloud-based network orchestration module 1530 that provides administrative services 1532, databases 1534, and other functional units such as machine learning and artificial intelligence units. The core network 1520 includes a plurality of components that provide services for the network, including an MMF (Mobility Management Function) unit 1521, a SON (Self Organizing Network) service unit 1522, a monitoring service unit 1523, an SGW/PGW (Serving Gateway/Packet Data Network Gateway) unit 1524, a domain proxy 1525, a TR069 unit 1526, and a KPI (Key Performance Indicator) service unit 1527. The core network 1520 may also include databases 1528 and other units for additional network services 1529 as required or useful. In some implementations, the AI module 1540 may be implemented as part of the core network module 1520.

In some embodiments the core network 1520 is connected to a cloud-based network orchestration module 1530. The core network 1520 and the orchestration module 1530 may be connected via a Packet Data Network (PDN) 1550. The cloud-based orchestration components 1530 includes an Administrative Service Unit 1532 for remote administration of the enterprise network, databases 1534, and other components as may be necessary or useful. In some implementations, the AI module 1540 may be implemented as part of the orchestration module 1530.

(25) Managing Network Resources Based on Service Types

Many mobile devices (UEs) are simultaneously in use on campus locations, and many different application and services are popular and concurrently operating. Due the large number of UEs on campus locations, and coinciding schedules (e.g., breaks, lunch) that cause many people to make calls and access services around the same time, a strong possibility arises that the wireless system that supports these UEs will become overloaded at certain times and places. A system is described herein that learns service demand patterns and proactively adjusts network resources based upon service policies and preferences, to minimize service disruptions that may otherwise occur. In some embodiments, network resource adjusting includes adjusting QoS parameters and/or bitrate resource allocation based on recognized and/or predicted demand for a given service.

Examples of services that can be provided by a wireless network include:
- voice calls;
- web browsing;
- downloads of document or other information;
- video (e.g., YouTube);
- social media (e.g., Facebook, Twitter);
- video security cameras, sensors, and many others.

Any of these services may be requested by UEs, and most users expect to have access to services when requested or shortly thereafter, with at least an acceptable level of service. During the process of connecting to the network the UEs often indicate to the wireless network the type(s) of services that they are requesting. Based upon the service type, the wireless network can assign a certain Quality of Service (QoS) to the UE for its session.

Figure 16:
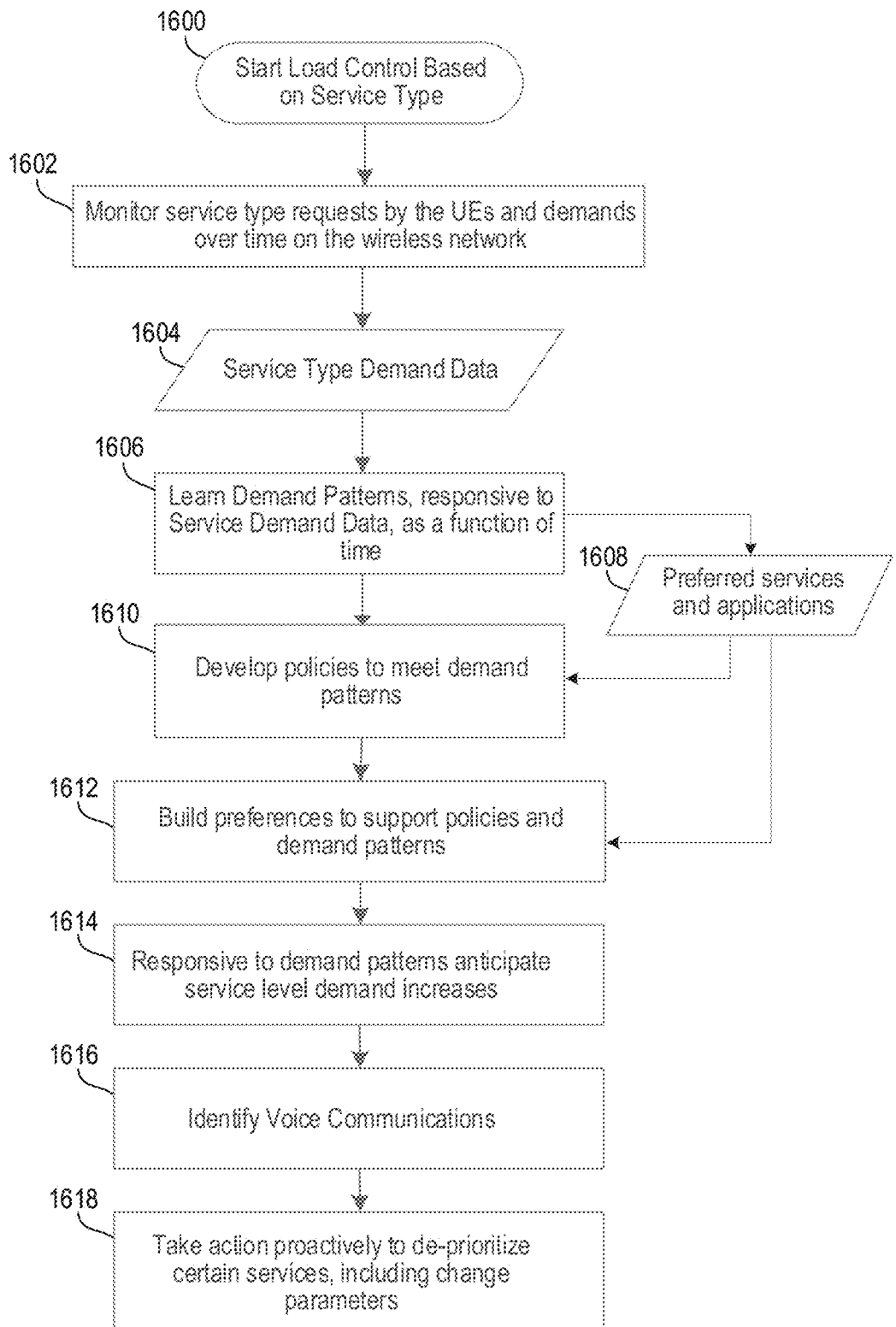
FIG. 16 is a flow chart of operations to learn service type patterns in a wireless communication network at a campus location, anticipate service requests, and control the services on the radio link to efficiently utilize network resources.

FIG. 16 is a flow chart of operations to learn service type patterns in a wireless communication network at a campus location, anticipate service requests, and control the services on the radio link to efficiently utilize network resources and provide appropriate service to as many UEs as possible. After starting operation (STEP 1600), the network begins monitoring service type requests by the UEs and the demands of those requesting (STEP 1602). Particularly, the numbers of each service type can be measured, including when the request was received, the type of service, the approximate location of the requesting UEs, the session time, and the BS/AP attached to the UE. Typically, this service type data (DATA 1604) is collected in the core network 1520, for example in the databases 1528.

(26) Recognize/Learn Demand for Services Using Machine Learning, Responsive to Service Data The service type data 1604 is then supplied from the core network 1520 to the Service Type Machine Learning (S-ML) Unit 1560 in the AI Module 1540 to learn the demand patterns for each service type as a function of time (or as a time-series of events), using any appropriate data mining, machine learning, and/or deep learning techniques. For example, the demand patterns for service types based on day-of-the-week/time-of-day can be learned and recognized. From these demand patterns or other information, preferred service and applications can be defined (DATA 1608). Accordingly, in some embodiments, the RAN that includes the plurality of BS/APs 1511 collects data and sends it to the AI module which performs data mining of the usage and service data to detect usage and service patterns.

(27) Develop Enterprise Policies and Preferences to Meet Predicted Service Demands.

Responsive to demand patterns, and the preferred services and application, policy configurations can be created (STEP 1610) for better supporting the preferred applications on the campus. Preferences can be built (STEP 1612) based on the learned information to adjust the parameters of both the application and the service based on the day/time, or a time-series of events. Following these preferences allows better regulation of the types of services that are admitted to the system, making the network more usable. These policies and preferences can be created and developed in the AI Planning Unit 1542 in the AI Module 1540, and stored in databases 1528 in the core network 1520, or in any suitable location.

In one embodiment, a User Interface (UI) 1570 is provided, connected to the core network 1520, which can be used by the managing entity (e.g., an IT administrator), to manually select and re-define the preferences and policies of the enterprise network. This UI 1570 allows the managing entity to change preferences and policies as needed or useful, which allows the enterprise to selectively throttle certain services and users (i.e., completely stop use reduced bit rates, or increase bit rates for certain services and users on one or more BS/APs), while giving other users priority. The services that can be selectively throttled include, for example, broadcast and multicast services. The services can be throttled at any time, for example throttling can be performed midstream. Throttling can be performed as a renegotiation of the current session that can be triggered if the QoS is reduced, or if more resources become available. Although not preferred, as an alternative the current session can be terminated, and then set up with different bitrate or QoS.

In some scenarios it is possible for a given user to be allowed certain services while other less preferred services are blocked. Unfortunately, blocking users' services is a denial of service that should be avoided under some circumstances; to address this, in some implementations certain users can be provided priority (e.g., by providing different levels of service for different classes of users such as gold, silver, bronze levels). For example, a user who is giving a presentation on campus in front of a group of people can be given a higher level of service. User service levels could be provided in the enterprise policy configuration.

In some instances, moving the UE to the MNO would be a better option for the UE. The Service Level Agreement (SLA) is negotiated using multi-dimensional parameterization with the managing entity establishing the allowed ranges, and these ranges could be implemented in the policies.

(28) Parameters Controlled

To establish preferences, some of the dimensions (parameters) to be considered include:
  ranges in the allowed QoS parameters,
  voice bit rate,
  other bit rates (e.g., security camera bit rate, web browsing),
  restrict the numbers of users supporting a given service (set to minimum),
  region(s) of the network,
  day-of-the-week,
  time-of-the-day, and
  using scheduler efficiency to define the relative priority of the particular service. Although it is not possible to directly control bit rates of many services (e.g., YouTube videos), the bit rate for a service can by indirectly changed by reducing the scheduler efficiency for the particular service or source (server) of a service, which de-prioritizes traffic (reduces priority), which causes the end-to-end efficiency of the service to automatically change. E.g., if students are taking a test, that server can be prioritized in the scheduler, which then de-prioritizes other services naturally, so that resources become available for the higher-priority services.

The User Interface (UI) 1570, which is connected to the core network 1520 and provided to the managing entity (e.g., an IT administrator), allows selection of these parameters, as well as select preferences and policies. Using the UI 1570 the managing entity can change preferences and policies as needed or useful, to allow the enterprise to selectively throttle certain services and users.

Responsive to learned service demand patterns, policies, and preferences of a particular enterprise network, an increase in services can be anticipated (STEP 1614) in, e.g., the AI Planning Unit 1542. When an increase is anticipated, voice calls are identified (STEP 1616), and action can be taken proactively (STEP 1618) to provide an appropriate service to a larger number of UEs, and to prevent service interruptions. This action can de-prioritize certain services, and/or change parameters. For example, the voice bit rate can be decreased, the ranges in the allowed QoS parameters can be decreased, bitrates can be decreased (e.g., voice, web browsing, video), the number of uses supported on a given service can be decreased (e.g., set to a minimum), and the scheduler efficiency can be changed as described above to prioritize certain services over others.

(29) Recognizing VoIP Call and Granting QoS

Recognizing VoIP packets in VoIP traffic, and allowing for an appropriate QoS to be granted can significantly improve the voice quality of a VoIP call. First however a VoIP call must be identified as a VoIP. Sometimes it is clear that a session's traffic is VoIP, for example the network may have been notified in some manner. However, in other instances, there is no indication, and the individual VoIP packets appear no different from any others.

Figure 17:
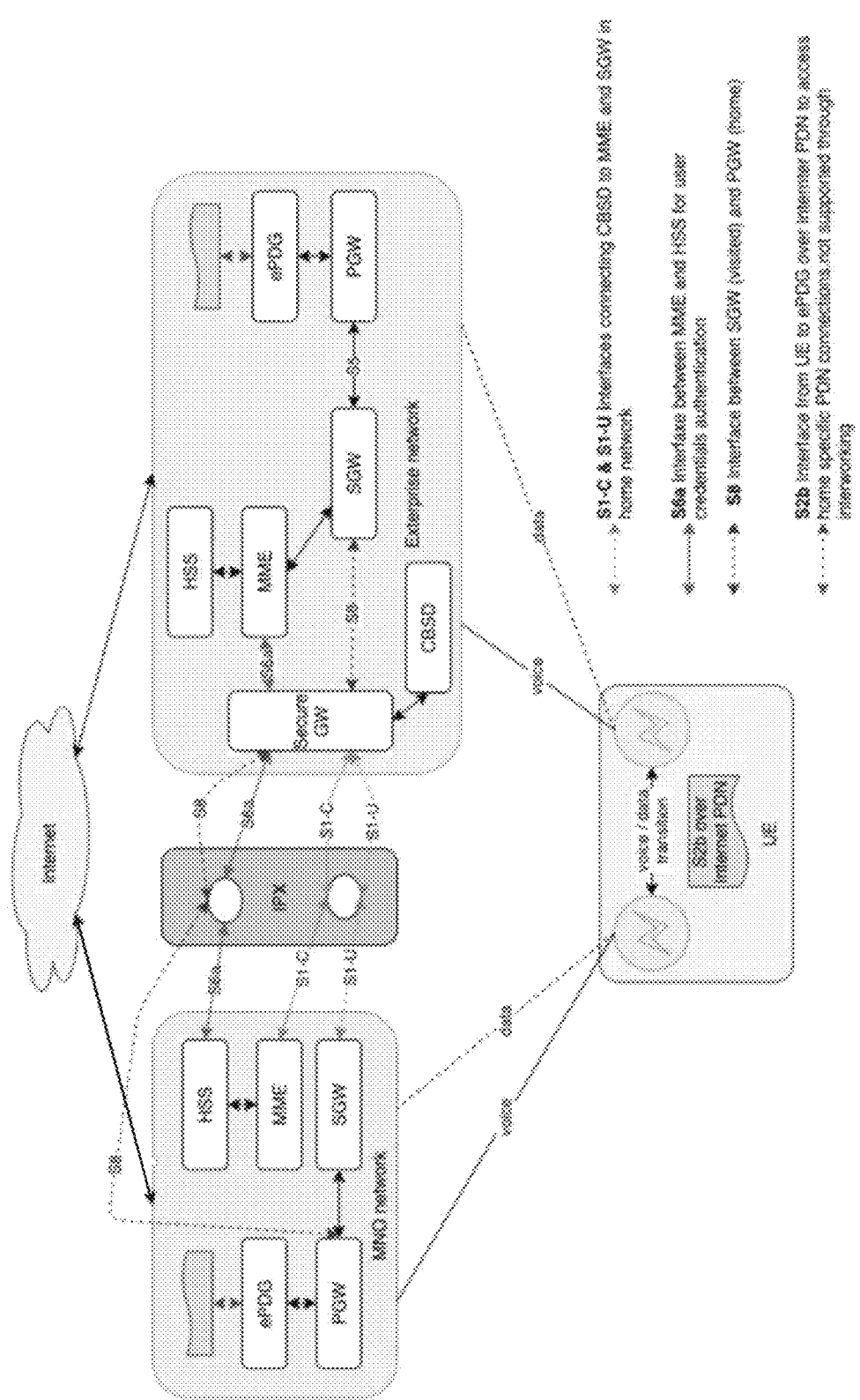
FIG. 17 is a block diagram of a communication system that shows an example of a scenario in which the VoIP call is routed from a UE, through the wireless (CBRS) network, through the internet, and then to the Mobile Network Operator (MNO).

For example, there are scenarios where the CBRS Enterprise network does not have direct connectivity with the MNO network, and the UE has acquired Enterprise credentials to allow for data offload on the CBRS network. FIG. 17 is a block diagram of a communication system that shows an example of a scenario in which the VoIP call is routed from a UE, through the wireless (CBRS) network, through the internet, and then to the Mobile Network Operator (MNO). Under such scenarios, the UE may have established an ePDG (evolved Packet Data Gateway) tunnel connectivity to reach, for example the IP Multimedia Subsystem (IMS) services from the MNO network. IMS is a general-purpose, open industry standard for voice and multimedia communications over packet-based IP networks. It is a core network technology, that can serve as a low-level foundation for technologies like VoIP, Push-To-Talk (PTT), Push-To-View, Video Calling, and Video Sharing. In this scenario, the VoIP packets are tunnel packets transmitted over the Internet PDN via the CBRS network.

The voice quality of a VoIP call can be significantly improved by recognizing VoIP calls in the wireless traffic, and allowing for an appropriate QoS to be granted to those calls. However, it can be difficult to distinguish the packets of a VoIP call from other, non-VoIP packets, especially if the packets are being transmitted through a tunnel such as a VPN tunnel. To identify VoIP call packets from the packets of all the other sessions at a BS/AP, incoming and/or outgoing packets are analyzed for signatures, using deep packet inspection, which inspects the headers and other portions of the packet to look for voice packet signatures. In some embodiments, VoIP packets are recognized using deep learning. Signatures of VoIP traffic include: uniform packet sizes that are relatively small (e.g., ~100 bytes-150 bytes) and packets that are periodic (e.g., the packets are generated every 20 ms). In addition, the VoIP packets may arrive bursty and with more jitter than other packets, especially in a system that operates in 40 ms DRX (Discontinuous Reception, which is used to conserve battery energy), in which the VoIP packets generated every 20 ms often arrive in groups of two or more.

In summary, the network traffic of a VoIP call with a given UE exhibits distinct listen, silence, talk periods that can be identified by observing, respectively: 1) the downlink (DL), 2) no-traffic (except control packets), and 3) uplink (UL). The ongoing communication sessions are analyzed to look for these signatures, and if found, the session is identified as a VoIP call session. Even during the silence periods, the control packets are exchanged in-band on the same channel as the VoIP traffic, and these control packets also exhibit the same signature that can be used to identify a VoIP session.

After a VoIP session has been identified, the appropriate QoS is assigned to it. If action is being taken (STEP 1618) to de-prioritize certain services in anticipation of an impending overload, then the VoIP session is marked as a voice call, which will give it a higher level of service than a generic data session. In addition, the VoIP-identified session packets may be marked with DSCP (Differentiated Services Code Points) codepoints for transmitting through the internet, e.g., the packets can be marked as expedited forwarding packets, so that internet recognizes that the packets are to be sent expeditiously, with minimal delay, jitter, and loss.

In some embodiments, recognizing the VoIP session may include recognizing voice over long-term evolution (VoLTE) packets, and in particular VoIP packets over ePDG. Furthermore, in some embodiments, the IP Planning system recognizes the congestion levels for appropriate bit rate grants for detected VoIP calls and the bit rate can be set accordingly, and in addition, the network may enable RTP (Real-time Transport Protocol) packet bundling.

The following summarizes some data collection and training/learning methods for service types. 1) To learn to recognize peak utilization of service types, data is collected to determine services that have peak utilization, per BS/AP, time-of-day, and day-of-week. The training/learning method is to determine the popular service(s) and ensure resource availability by regulating other traffic/QoS allowed for this service. 2) For voice traffic recognition, collect data and look for a specific pattern of talk/listen/silence, periodically-generated packets, and uniform packet sizes. The packet sizes are dependent on the type of connectivity. In one embodiment, recognizing a voice over ePDG (connecting to 4G Evolved Packet Core (EPC)) or N3IWF (Non-3GPP Interworking Function) (connecting to 5G core (5GC)) will need to be done given that QoS interface to the PCRF (Policy and Charging Rules Function) will not exist for this. The training/learning method has the purpose of granting the QoS bit rates based on the current congestion levels in the network. The bitrates need to account for the packet sizes carried over the ePDG/N3IWF connection. Features like RTP packet bundling can be enabled to reduce packet-header-size implications. Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of learning and utilizing a wireless footprint that defines wireless coverage of a plurality of external Mobile Network Operator Networks (MNs) at a campus location on which an Enterprise Network (EN) has deployed a Radio Access Network (RAN) that includes a plurality of Base Stations/Access Points (BS/APs) to provide wireless coverage to a plurality of mobile User Equipment Devices (UEs), the plurality of mobile UEs measuring signals from the plurality of BS/APs as the mobile UEs travel through the campus location, the mobile UEs also measuring one or more signals from the plurality of MNs, comprising:
monitoring a plurality of said mobile UEs wirelessly connected to the EN while said mobile UEs travel through the campus location;
from each of said UEs connected to the RAN, collecting signal quality data of the BS/APs measured by the UE;
utilizing said signal quality data to define a RAN location;
from each of said UEs that is measuring signals from an MN, collecting signal quality data for the MNs that said UE is measuring, and associating said MN signal quality data with the RAN location provided by said UE;
collecting said RAN and MN signal quality data from said plurality of UEs and processing the signal quality data to map the MNO Network wireless coverage as a function of RAN location and thereby define a footprint of each external network (MN) as a function of RAN location; and
transferring a UE between the EN and the MN responsive to the UE's RAN location and the footprint of at least one of the MNO Networks with which the UE has a subscription.

2. The method of claim 1 wherein said plurality of MNs are operated by a plurality of Mobile Network Operators (MNOs), and each of said plurality of UEs has a subscription with at least one of said MNOs, and further comprising:

observing a congestion occurrence at a RAN location in the EN;

identifying UEs, connected to the RAN in the EN, at a RAN location proximate to the congestion occurrence;

determining the MNOs with which the identified UEs have a subscription;

responsive to the MN footprints of the MNOs to which the identified UEs are subscribed, transferring at least one of the identified UEs from the EN to its subscribed MN, to mitigate said congestion occurrence.

3. The method of claim 2 further comprising predicting the congestion occurrence at a RAN location in the EN.

4. The method of claim 1 wherein said plurality of MNs are operated by a plurality of Mobile Network Operators (MNOs), and each of said plurality of UEs has a subscription with at least one of said MNOs, and further comprising, responsive to the footprint of at least one MNO, transferring at least one of the UEs from the MNO network to the EN responsive to the footprint of said MN.

5. The method of claim 1 further comprising:
receiving a request from a UE for entry into the EN;
determining the MN with which the requesting UE has a subscription; and
responsive to the footprint of said subscribed MN, triggering transfer of said requesting UE from the subscribed MN to the EN.

6. The method of claim 1 wherein said plurality of MNs are operated by a plurality of Mobile Network Operators (MNOs), and each of said plurality of UEs has a subscription with at least one of said MNOs, and further comprising transferring at least one of the UEs from the EN to its subscribed MN responsive to the footprint of said MN.

7. The method of claim 6 wherein the campus location has a boundary perimeter, and further comprising monitoring the UE RAN locations of a plurality of UEs, and if movement is detected in one of said UEs proximate to the boundary perimeter, and said movement indicates the UE will likely exit the EN, then transferring said at least one UE from the EN to its subscribed MN.

8. A method of efficiently transferring wireless UE communication between an enterprise wireless network (EN) and one of a plurality of Mobile Network Operator (MNO) Networks, the enterprise network including a Radio Access Network (RAN) that includes a plurality of Base Stations/Access Points (B S/APs) for communicating with a plurality of User Equipment devices (UEs) on the campus location, comprising:
learning the footprints of the plurality of MNOs within the campus location;
monitoring the UEs and their movement to determine their RAN location and projected movement in the network;
for each of the UEs, determining an MNO with which the UE has a subscription; and
transferring at least one UE from the enterprise network to the MNO Network responsive to said footprint;
thereby efficiently operating the EN by coordinating wireless coverage on its campus location with a plurality of MNO Networks that have coverage within the campus location;
wherein the step of learning the footprints includes
monitoring a plurality of said mobile UEs wirelessly connected to the EN;
collecting signal quality data of the BS/APs measured by said plurality of UEs;
utilizing said signal quality data to define a RAN location;
from each of said UEs, collecting signal quality data for the MNs that said UE is measuring, and associating said MN signal quality data with the RAN location provided by said UE; and
processing said RAN and MN signal quality data to map the MNO Network wireless coverage as a function of RAN location and thereby define a footprint of each external network (MN) as a function of RAN location.

9. The method of claim 8 wherein the campus location includes boundary perimeters, and further including:
determining a RAN location for said UE,
predicting that the UE will cross the boundary perimeter and therefore will need to exit the EN, and
wherein the step of transferring includes transferring said UE from the EN to the MNO responsive to the MN footprint.

10. The method of claim 8 wherein the step of transferring at least one UE from the enterprise network to MNO Network includes, monitoring the EN, observing a congestion occurrence, and transferring said UE to the MNO Network responsive to said congestion occurrence.

11. The method of claim 8 further including receiving an admission request from a UE, determining a RAN location for said UE, and wherein the step of transferring includes admitting said UE into the EN.

12. A network apparatus for managing transfers of mobile User Equipment Devices (UEs) between a wireless Enterprise Network (EN) and a Mobile Network Operator (MNO) Network, the EN providing wireless coverage on a campus location on which a plurality of MNO Networks also provide at least partial coverage, the EN including a Radio Access Network (RAN) that has a plurality of B S/APs deployed on a campus location for connection to a plurality of mobile User Equipment Devices (UEs), the plurality of mobile UEs measuring signals from the plurality of B S/APs as the mobile UEs travel through the campus location, the mobile UEs also measuring one or more signals from the plurality of MNO Networks (MNs), comprising:
an MN Footprint Learning Unit that provides wireless footprints of MNOs that have wireless coverage on the campus location; and
a Transfer Management Module for transferring wireless UE communications between the EN and one of the MNOs responsive to the MN footprint:
wherein the MN Footprint Learning Unit comprises:
means for monitoring a plurality of said mobile UEs wirelessly connected to the EN while said mobile UEs travel through the campus location;
means for collecting signal quality data of the BS/APs measured by the UE from each of said UEs connected to the RAN;
means for utilizing said signal quality data to define a RAN location;
from each of said UEs that is measuring signals from an MN, means for collecting signal quality data for the MNs that said UE is measuring, and associating said MN signal quality data with the RAN location provided by said UE; and
means for collecting said RAN and MN signal quality data from said plurality of UEs and processing the signal quality data to map the MN wireless coverage as a function of RAN location and thereby define a footprint of each external network (MN) as a function of RAN location.

13. The apparatus of claim 12 wherein the EN comprises a Citizen's Broadband Radio Service (CBRS) system, and the BS/APs comprise CBRS Devices (CBSDs) that are located at the campus location.

14. The network apparatus of claim 12 wherein the Transfer Management Module comprises:
- an admission control unit for admitting a UE into the EN from an MNO Network responsive to the footprint of said MNO Network;
- an exit control unit for transferring communications of a UE connected to the EN to an MNO Network responsive to the MN footprint of said MNO Network; and
- a congestion control unit for transferring communications of a UE connected to the EN, from the EN to an MNO Network responsive to the MN footprint of said MNO Network.

15. The network apparatus of claim 12 wherein the Transfer Management Module comprises:
- an admission control unit for admitting a UE into the EN from an MNO Network responsive to the footprint of said MNO Network.

16. The network apparatus of claim 12 wherein the Transfer Management Module comprises:
- an exit control unit for transferring communications of a UE connected to the EN to an MNO Network responsive to the MN footprint of said MNO Network.

17. The network apparatus of claim 16 wherein the campus location has a boundary perimeter, and further comprising
- a UE Monitoring and Data Collection Unit for monitoring the UE RAN locations of a plurality of UEs, and wherein the exit control unit includes means for determining if movement is detected in one of said UEs proximate to the boundary perimeter, and said movement indicates the UE will likely exit the EN, then transferring said at least one UE from the EN to its subscribed MN.

18. The network apparatus of claim 12 wherein the Transfer Management Module comprises:
- a congestion control unit for transferring communications of a UE connected to the EN, from the EN to an MNO Network responsive to the MN footprint of said MNO Network.

19. The network apparatus of claim 18 wherein said plurality of MNs are operated by a corresponding plurality of Mobile Network Operators (MNOs), and each of said plurality of UEs has a subscription with at least one of said MNOs, and the congestion control unit further comprises:
- means for predicting or observing a congestion event at a RAN location in the EN;
- means for identifying UEs, connected to the RAN, at a RAN location proximate to the congestion event;
- means for determining the MNOs with which the identified UEs have a subscription; and
- means, responsive to the footprint, for determining which of the identified UEs to transfer from the EN to its subscribed MN responsive to the footprint of said MN.

* * * * *